United States Patent
De et al.

(10) Patent No.: US 11,411,491 B2
(45) Date of Patent: Aug. 9, 2022

(54) MULTIPLE OUTPUT VOLTAGE CONVERSION

(71) Applicant: Intel Corporation, Santa Clara, CA (US)

(72) Inventors: Vivek De, Beaverton, OR (US); Krishnan Ravichandran, Saratoga, CA (US); Harish Krishnamurthy, Beaverton, OR (US); Khondker Ahmed, Hillsboro, OR (US); Sriram Vangal, Portland, OR (US); Vaibhav Vaidya, Portland, OR (US); Turbo Majumder, Portland, OR (US); Christopher Schaef, Hillsboro, OR (US); Suhwan Kim, Hillsboro, OR (US); Xiaosen Liu, Portland, OR (US); Nachiket Desai, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 16/642,853

(22) PCT Filed: Sep. 29, 2017

(86) PCT No.: PCT/US2017/054422
§ 371 (c)(1),
(2) Date: Feb. 27, 2020

(87) PCT Pub. No.: WO2019/066929
PCT Pub. Date: Apr. 4, 2019

(65) Prior Publication Data
US 2020/0350817 A1 Nov. 5, 2020

(51) Int. Cl.
*H02M 3/158* (2006.01)
*H02M 3/07* (2006.01)
*H02M 1/00* (2006.01)

(52) U.S. Cl.
CPC .............. *H02M 3/07* (2013.01); *H02M 1/009* (2021.05); *H02M 1/0095* (2021.05); *H02M 3/1582* (2013.01)

(58) Field of Classification Search
CPC ... H02M 1/009; H02M 3/1582; H02M 1/0095
See application file for complete search history.

(56) References Cited

U.S. PATENT DOCUMENTS 6,657,875 B1    12/2003  Zeng et al.
9,866,113 B1 *  1/2018   Assaad ................... H02M 3/07
(Continued)

FOREIGN PATENT DOCUMENTS

WO    2009-020939 A1    2/2009
WO    2015-108613 A1    7/2015

OTHER PUBLICATIONS

International Search Report and Written Opinion dated Jun. 28, 2018 for International Application No. PCT/US2017/054422, 15 pages.

*Primary Examiner* — Peter M Novak
(74) *Attorney, Agent, or Firm* — Schwabe, Williamson & Wyatt, P.C.

(57) ABSTRACT

Voltage dividing circuitry is provided for use in a voltage converter for converting at least one input Direct Current, DC voltage to a plurality of output DC voltages. The voltage dividing circuitry including a voltage input port to receive an input DC voltage and an inductor having an input-side switch node and an output-side switch node. The output side switch node is connectable to one of a plurality of voltage output ports to supply a converted value of the input DC voltage as an output DC voltage. The flying capacitor interface has a plurality of switching elements and at least one flying capacitor, the flying capacitor interface to divide the input DC voltage to provide a predetermined fixed ratio of the input DC voltage at the input-side switch node of the (Continued)

inductor. A voltage converter and a power management integrated circuit having the voltage dividing circuitry are also provided.

22 Claims, 10 Drawing Sheets

(56) References Cited

U.S. PATENT DOCUMENTS

| | | | |
|---|---|---|---|
| 2008/0239772 A1 | 10/2008 | Oraw et al. | |
| 2015/0207401 A1* | 7/2015 | Zhang | H02M 1/32 323/271 |
| 2015/0249403 A1* | 9/2015 | Sato | H02M 7/25 363/127 |
| 2016/0352219 A1* | 12/2016 | Amgad Abdulslam | H02M 3/07 |
| 2019/0068051 A1* | 2/2019 | Yang | H02M 3/158 |

* cited by examiner

MULTIPLE OUTPUT VOLTAGE CONVERSION

CROSS REFERENCE TO RELATED APPLICATIONS

The present application is a national phase entry under 35 U.S.C. § 371 of International Application No. PCT/US2017/054422, filed Sep. 29, 2017, entitled "MULTIPLE OUTPUT VOLTAGE CONVERSION", which designated, among the various States, the United States of America. The disclosure of International Application No. PCT/US2017/054422 is hereby incorporated by reference in its entirety.

TECHNICAL FIELD

Embodiments described herein generally relate to the field of voltage conversion, and more particularly, to Direct Current (DC) to DC voltage conversion with multiple outputs.

BACKGROUND

Delivering power to integrated circuit devices such as a System On Chip often requires a step-up or a step-down in voltage relative to an input voltage and different digital domains on an integrated circuit device may have different voltage specifications, making multiple output voltage converters useful to meet requirements. Form-factor constrained electronic devices such as smartphones and wearables have more limited space available on-chip for power conversion. DC to DC multiple output voltage converters may be used to conveniently fulfill voltage requirements of such devices to reduce the number of passive components such as resistors, capacitors and inductors used to serve multiple digital voltage domains. For example, a single inductor may be used to serve multiple voltage outputs in a single input, multiple output (SIMO) voltage converter to save space. However, as a conversion ratio between voltage inputs and outputs increases then larger inductors tend to be appropriate, which can lead to a larger footprint, lower efficiency and poorer regulation performance. High conversion ratios are common for battery-powered devices such as wearable devices.

Some multiple output voltage converters also have multiple inputs and even if one input is high voltage, for example a voltage characteristic of a Lithium-ion battery, then all transistors, capacitors and inductors of the voltage conversion circuitry tend to have correspondingly high voltage. This may result in lower switching frequencies, larger components in terms of circuit surface area consumed and poorer transient performance.

Higher voltage passive components tend to have lower switching frequencies due to field strength considerations. This lack of efficiency results in a preference for use of single input, single output voltage converters. Thus there is scope for providing a DC to DC multiple output voltage converter capable of converting a high voltage input to multiple voltage outputs at different levels using less space on the integrated circuit and yet providing improved efficiency.

BRIEF DESCRIPTION OF THE DRAWINGS

Embodiments described herein are illustrated by way of example, and not by way of limitation, in the figures of the accompanying drawings in which like reference numerals refer to similar elements.

DESCRIPTION OF EMBODIMENTS

Illustrative embodiments of the present disclosure include, but are not limited to, methods, systems and apparatuses and machine-readable instructions for peak power determination in integrated circuit devices.

Figure 1:
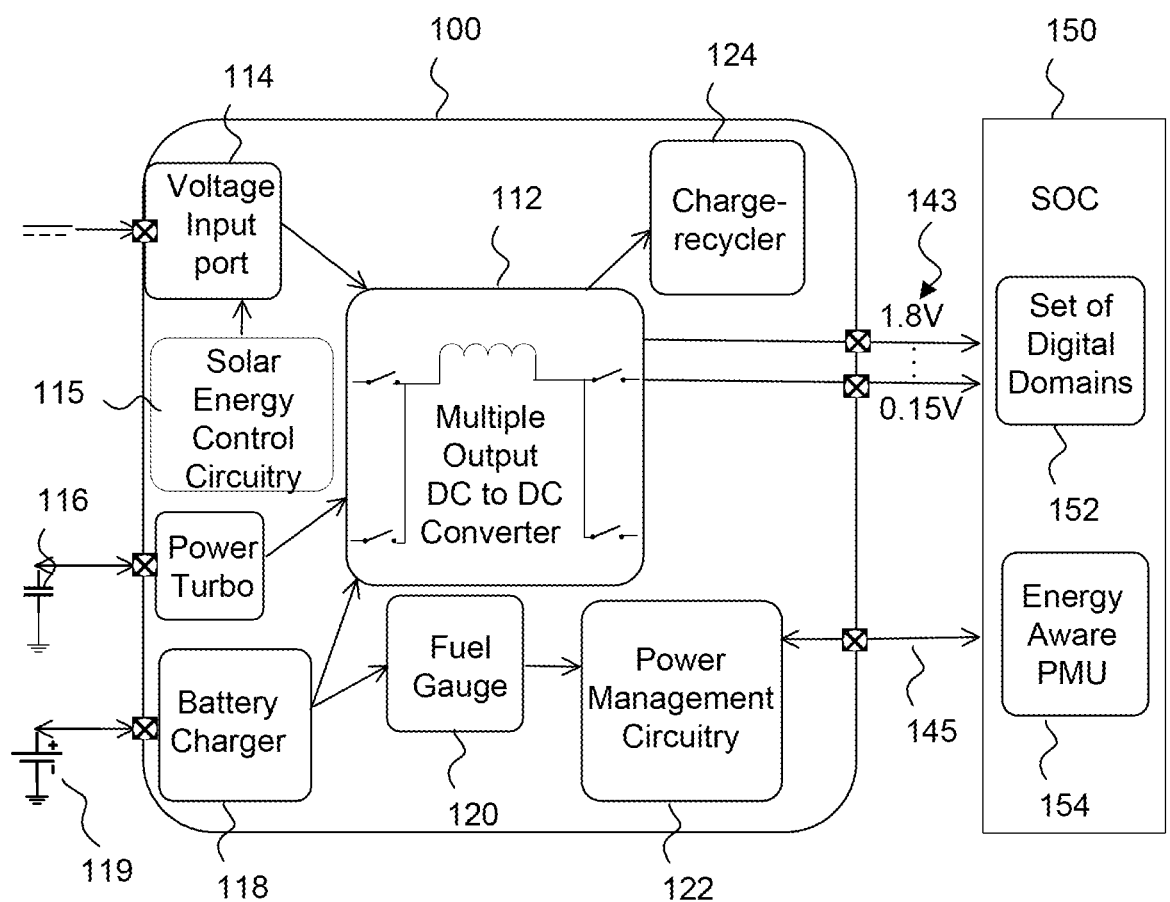
FIG. 1 schematically illustrates a power management apparatus 100 a Power Management Integrated Circuit.

FIG. 1 schematically illustrates a Power Management Integrated Circuit (PMIC) 100 comprising: a multiple output DC to DC converter 112, a voltage input port 114 having an associated solar energy control circuit 115, a power turbo voltage source 116, a battery charger 118, a fuel gauge 120, a set of power management circuitry 122 and a charge recycling output 124. The PMIC 100 provides a plurality of different voltage outputs 143 to a set of digital domains 152 (e.g., voltage domains of digital loads) of a System On Chip (SOC) 150. The plurality of voltage outputs 143 may provide a respective plurality of different voltages via high efficiency voltage rails, such as voltages ranging from 0.15V to 1.8V. The SOC 150 has an energy aware power management unit (PMU) 154 having a bidirectional digital communication link 145 with the power management circuitry 122 of the PMIC 100.

The voltage input port 114 may receive DC power from a mains supply via an Alternating Current (AC) to DC adapter and may additionally, or alternatively receive DC power, from a photovoltaic cell, a solar panel a fuel cell a dynamo or a DC generator for example. One or more input DC voltages from the DC input port 114 may be supplied as an input voltage to the multiple output DC to DC converter 112. Further inputs to the multiple output DC to DC converter 112 may comprise a voltage input from the power turbo voltage source 116, which is provided to supply a short-duration boost to power to achieve a performance boost. The battery charger 118 may supply a voltage input to the multiple output DC to DC converter 112 using power from a battery 119, for example, a solid-state battery or a polymer Lithium battery.

A characteristic of batteries such as the battery 119 is that an output voltage can vary as the available battery charge is used up and at some point, the available battery voltage may not meet demands of the battery load. The fuel gauge 120 may be used to determine a battery power or battery current for example, by using a coulomb gauge or a sense resistor to monitor a total quantity of charge supplied to the battery in a charge cycle or received from the battery in a discharge cycle. The fuel gauge may provide an indication of at least one of a battery charge level and a full battery capacity in dimensioned units such as Coulombs. The full battery capacity may decline in value over a battery lifetime due to effects of multiple charge-discharge cycles. The fuel gauge 120 may thus provide an indication of a peak power capacity of the battery at a given time, which may depend on calibration of the battery and a battery charge level at the given time. The multiple output DC to DC converter 112 may be used to boost a battery output up to a target output level to effectively extend a life of the battery. Output from the fuel gauge 120 may be supplied as input to the power management circuitry and communicated to the energy aware power management unit 154 of the SOC.

Although DC voltages may be available to the SOC, the available voltage may not be suitable for a given one of the set of digital domains 152. The multiple output DC to DC converter 112 allows voltages to be supplied to the plurality of different high efficiency voltage rails 143 to be output to the set of digital domains 152 by providing either a step up in voltage or a step down in voltage between an input portion and an output portion of the multiple output DC to DC converter 112.

The charge recycler 124 may implement implicit on-chip DC to DC conversion using multiplier logic and linear regulators and by recycling charge from one domain to another, rather than by using voltage down-converters. This is an alternative to the DC to DC conversion of the present technique as implemented by the multiple output DC to DC converter 112, but can be used alongside it. The multiple output DC to DC converter 112 may operate as a "buck converter" to generate a reduced DC level relative to an input DC voltage or may operate as a "boost converter" to generate an increased DC level relative to the input DC voltage. In either case the voltage conversion may be performed by filtering a Pulse Width Modulated signal through an inductor capacitor (LC) filter, where L represents inductance and C represents capacitance. By varying a frequency or a duty cycle of the PWM signal different DC levels may be generated. The arrows in FIG. 1 indicate a flow of current from inputs such as the voltage input port 114 and the battery charger 118 to the SOC 150 via the multiple output DC to DC converter 112 to the voltage rails and associated output ports of the PMIC. However, according to the present technique, current may flow bidirectionally such that power (energy) may be transferred from any one of the inputs or outputs to any other one of the inputs or outputs via the multiple output DC to DC converter 112 to perform a step-up or a step-down in voltage as required by the selected connection path. This provides a flexible and efficient way of performing voltage conversion.

Figure 2A:
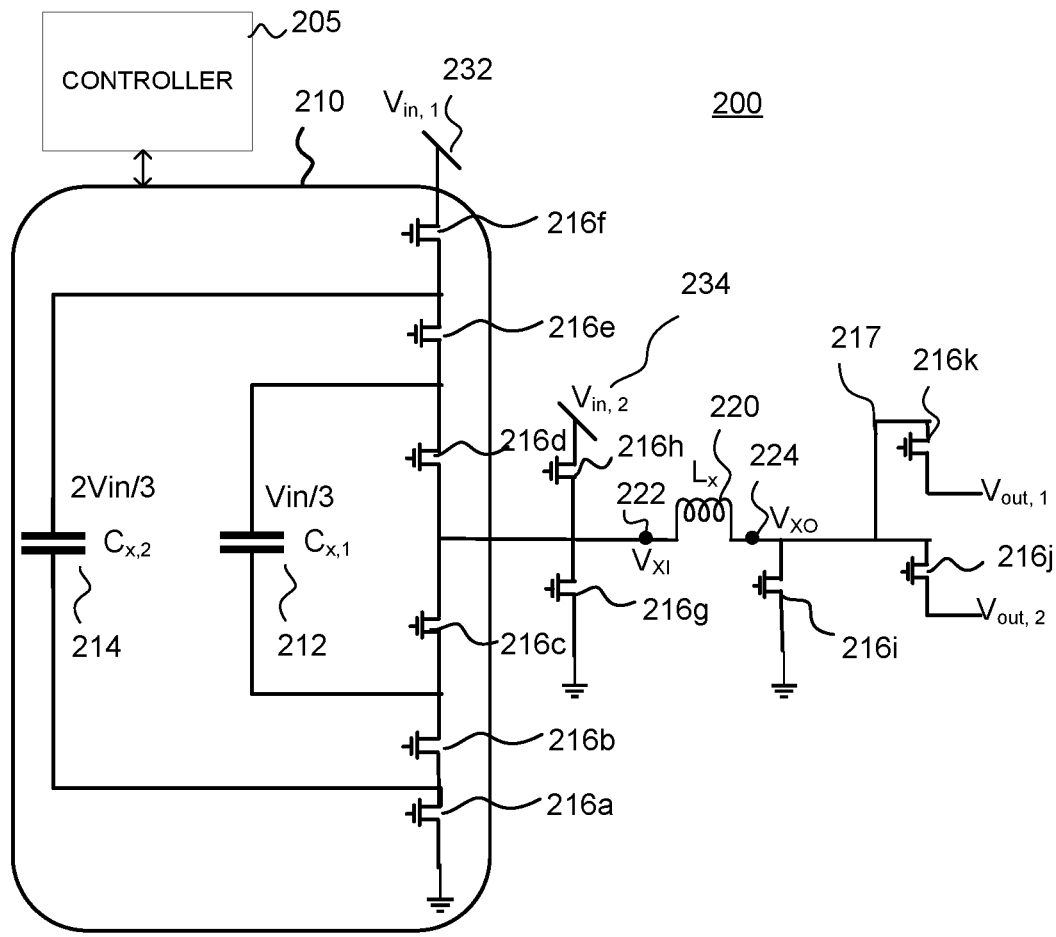
FIG. 2A schematically illustrates a circuit diagram of a multiple output DC to DC converter having a flying capacitor interface comprising two flying capacitors.

FIG. 2A schematically illustrates a circuit diagram of a multiple output DC to DC converter having a flying capacitor interface comprising two flying capacitors.

The multiple output DC to DC converter 200 comprises a flying capacitor interface 210 having a first flying capacitor $C_{X,1}$ 212, a second flying capacitor $C_{X,2}$ 214 and six switching elements comprising a first switching element 216a, a second switch element 216b, a third switching element 216c, a fourth switching element 216d, a fifth switching element 216e and a sixth switching element 216f. The six switching elements 216a to 216f are arranged in series with a first input DC voltage source $V_{IN,1}$ 232 and the first switching element 216a has a connection to ground. Any type of switching element may be used for any one of the switches, such as a transistor switching element. Combinations of different types of switching elements may be used. The multiple output DC to DC converter 200 further comprises an inductor 220, the inductor having an input-side switch node $V_{XI}$ 222 and an output-side switch node $V_{XO}$ 224. On an input side of the inductor 220 there is a seventh switching element 216g and an eighth switching element 216h. The seventh switching element 216g provides a connection to ground when switched on, whereas the eighth switching element 216h provides a connection to a second voltage input $V_{IN,2}$ 234. The output-side switch node $V_{XO}$ 224 of the inductor 220 may be connected to ground via a ninth switching element 216i or alternatively, may be switched to one of a first voltage output $V_{OUT,\,1}$ via a tenth switching element 216j or to a second voltage output $V_{OUT,\,2}$ via an eleventh switching element 216k. The output voltages $V_{OUT,\,1}$ and $V_{OUT,\,2}$ supply respective digital loads (not shown), such as digital loads of a SOC (e.g. SOC 150 of FIG. 1) or another integrated circuit device. The different voltage inputs 232 and 234 may be connected individually or in parallel to the input-side switch node of the inductor 222. The input voltage sources may be connected to switch units comprising simple buck converters, 3-level buck converters or flying capacitor interfaces according to the present technique. The input-side switch node 222 may thus be shared between two or more switch units dedicated to respective voltage inputs. When a data processing system needs to draw energy from a particular input source, the appropriate switch unit may be enabled whilst the other may be disabled. Similarly the output side switch node 224 may be connected to multiple outputs via switching elements 216j and 216k, which are selectably connectable depending on an output to which energy is to be delivered.

The first flying capacitor 212 is connected across two of the six switching elements 216a to 216f of the flying capacitor interface 210 to provide a predetermined fixed ratio (less than one) of the first input voltage 232 at the input-side switch node 222, in this case ⅓ $V_{IN,\,1}$. Similarly, the second flying capacitor 214 is connected in parallel across four of the six switching elements 216a to 216f and is capable of storing a fraction corresponding to ⅔ of the input DC voltage, ⅔ $V_{IN,\,1}$. Thus the flying capacitor may be considered to be part of voltage dividing circuitry of a voltage converter. The voltage dividing circuitry may also comprise an inductor.

In alternative examples further switching elements and further flying capacitors may be provided. For example, to obtain ¼ $V_{IN,1}$ at the input-side switch node 222, a further switching element may be placed at each side of the array of six switching elements 216a to 216f and a third flying capacitor may be connected in parallel across 216a to 216f, with the three flying capacitors storing ¼ $V_{IN,1}$, ½ $V_{IN,1}$ and ¾ $V_{IN,1}$ respectively from innermost to outermost. In a simpler alternative example, a single flying capacitor could be connected across two of an array of four switching elements to store ½ $V_{IN,1}$ and to provide two different switch configurations in which the fraction ½ $V_{IN,1}$ is provided at the input-side switch node 222. In particular, assuming that only $C_{X,1}$ (not and $C_{X,2}$) and the four innermost switches 216b, 216c, 216d, 216e of the six switches 216a to 216f of the FIG. 2A example are present then the following two configurations give ½ $V_{IN,1}$ at the input-side switch node 222:
  i. Switching elements 216c and 216e on; switching elements 216c, 216d off with Cx,1 charging
  ii. Switching elements 216b and 216d on; switching elements 216b, 216e off with Cx,1 discharging.

As will be illustrated with reference to FIG. 3A, FIG. 4 and FIG. 5, there are three distinct switch configurations of the example circuit of FIG. 2A which give a fraction ⅓* $V_{IN,1}$ at the input-side switch node 222.

FIG. 2A also shows a controller 205 for controlling the switch configurations of the flying capacitor interface 210 and the other switching elements 216g, 216h, 216i, 216j and 216k of the voltage conversion circuitry. The controller 205 may control timings and durations of different circuit phases and modes. The controller may comprise dedicate or special purpose processing hardware and may execute machine-readable program code to perform the control. The controller 205 is illustrated only in the FIG. 2A example, but all of the example circuits may implement such a controller 205.

In a conventional voltage converter such as a buck converter, the flying capacitors 212, 214 would be absent and an array of, for example, four switches 216b to 216e could be used to alternately connect the large input voltage $V_{IN,1}$ to the input-side switch node 222 and to connect the input-side switch node 222 to ground (by switching 216b and 216c on). A resulting square wave at the input-side switch node 222 could then be filtered by an LC capacitor to obtain a "smoothed" version of the square wave corresponding to an output DC voltage smaller in magnitude than $V_{IN,1}$. The on-time to off-time ratio, which may be referred to as a "duty cycle" may be programmable by adjusting a switching frequency between 216b and 126e or 216c and d being on to output ½ $V_{IN,1}$ and switching 216b and 216c on to ground the input-side switch node to obtain the low portion of the square wave. In such known buck converters, direct switching of a large input voltage is likely to require correspondingly high voltage transistors 216b, 216c, 216d, 216e and a large inductor 220 and filter capacitor (not shown).

By way of contrast, according to the present technique, one or more flying capacitors 214, 216 may be provided to divide the input DC voltage, $V_{IN,1}$, by a predetermined fixed ratio to provide, upon charge or upon discharge of one or more of the flying capacitors, a voltage at the input-side switch node 222 depending on the predetermined fixed ratio. For example, an arrangement with one flying capacitor capable of storing ½ $V_{IN,1}$ may provide ½ $V_{IN,1}$ at the input-side switch node 222. As a further example, the arrangement of FIG. 2, having two flying capacitors 212, 214 with one flying capacitor capable of storing ⅓ $V_{IN,1}$ and the other flying capacitor capable of storing ⅔ $V_{IN,1}$ may be capable of providing ⅓ $V_{IN,1}$ at the input-side switch node.

Although the example circuit of FIG. 2A comprises a simple case of a single flying capacitor interface on a first voltage input. One or more flying capacitor interfaces may be provided on any voltage input or any voltage output of a voltage converter. The flying capacitor interfaces may have different numbers of flying capacitors and are not limited to the two flying capacitors of the FIG. 2A example.

As described above in relation to FIG. 1, the multiple output DC to DC converter 112 may be used to convert a voltage selected form any one of the inputs to or outputs from the integrated circuit 100 to any other (different) input or output. Furthermore, a voltage divider comprising a flying capacitor interface 210 and an inductor 220 may be provided on one or more of the output voltage rails such as the voltage rail 217 connecting the output-side switch node 224 to the switching element 216k and to $V_{out,1}$. Similarly, a voltage divider may be provided on an input voltage rail such as a voltage rail associated with the voltage input 232. Providing a voltage divider on an output voltage rail 217 may be useful, for example, in cases where one voltage rail on a SOC to be supplied by the voltage converter is higher than the majority of other voltage rails so that the further voltage divider could be used in reverse as a multiplier (i.e. step-up or boost).

Figure 2B:
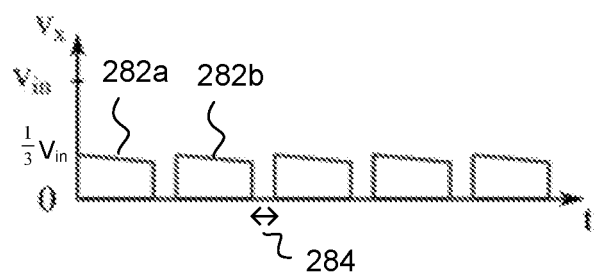
FIG. 2B is a graph schematically illustrating voltage at the input-side switch node of the inductor as a function of time for the circuit of FIG. 2A.

FIG. 2B is a graph schematically illustrating voltage at the input-side switch node 222 as a function of time for the circuit of FIG. 2. The voltage at the input-side switch node 222 has a square wave profile, with high values 282a, 282b corresponding to ⅓ $V_{IN,1}$ and low values, e.g., 284, corresponding to zero voltage. The relative duration of the $V_{XI}$ 222 being at ⅓ $V_{IN,1}$ to the duration of $V_{XI}$ 222 being at 1 determines the voltage at the output-side switch node $V_{XO}$ 224. Two example configurations of the circuit of FIG. 2A giving the two different voltage levels corresponding to the square wave are illustrated in FIG. 3A and FIG. 3B, which are described below. When the input voltage $V_{IN,1}$ increases in magnitude, to achieve the same output voltage at $V_{XO}$ 224, the duration in time of the high pulses $\Delta t_{HIGH}$ may be decreased relative to the low portions of the square wave having duration $\Delta t_{LOW}$, which may tighten requirements on the filtering inductor and capacitor, increasing their size. It can be seen from FIG. 2B that use of the flying capacitor(s) divides Vin to reduce voltage at the input-side switch node 222, which in turn relaxes the requirements on the inductor 220 and associated circuitry such as the switching elements 216a to 216k.

Accordingly, implementation of the flying capacitor(s) in the DC to DC multiple output converter makes possible the use of high-performance, low-voltage switching elements (e.g. transistors) even in cases where one or more inputs or outputs exceed the voltage ratings of the switching elements. In the circuit of FIG. 2A, a first phase and an associated first switch configuration may give rise to the high portions 282a, 282b of the square wave, whereas a second phase and an associated second switch configuration may give rise to the low phases of the square wave. The square wave profile of FIG. 2B is applicable to the input-side switch node 222 in a buck mode of the voltage converter. Note that the output-side switch node 224 voltage will differ from that at the input-side voltage node 222 due to the filtering effects of the inductor 220 and the value of the output voltage $V_{O1}$ or $V_{O2}$ may be dependent on the timings of the two different phases (characteristics of the square wave at the input-side switch node).

By way of contrast to the buck mode voltage profile illustrated in FIG. 2B, in a boost mode, the input-side switch node 222 remains at a non-zero value corresponding to a fraction of the input voltage $V_{IN,1}$ for both phases whereas the output-side switch node 222 is zero in a first phase, but connected to one of the voltage outputs $V_{OUT,1}$ or $V_{OUT,2}$ in a second phase. The switch configurations in phase 1 and phase 2 differ for the buck mode and the boost mode. However, a third mode may be provided, which can be used for both buck and boost of an input voltage simply by varying the relative durations (or duty cycle) of a phase 1 switch configuration and phase 2 switch configurations. One of the benefits of the buck-boost mode is that it can change between step-up or step-down conversion merely by adjusting timings of the two phases without specifically configuring the switching elements specifically for buck or for boost operation. In some cases this improved flexibility and convenience may result in lower conversion efficiency (i.e. higher losses), but the associated benefits still make this mode practically useful. The table below summarizes values at each of the input-side switch node 222 ($V_{XI}$) and the output-side switching node 224 ($V_{XO}$) for each of three possible modes of operation of the multiple output voltage converter according to the present technique.

TABLE 1

| Mode | Phase 1 | Phase 2 |
| --- | --- | --- |
| Buck (voltage step-down) | $V_{XI}$ = fraction of $V_{IN}$; $V_{XO}$ = $V_{O1}$ or $V_{O2}$ | $V_{Xi}$ = 0; $V_{XO}$ = $V_{O1}$ or $V_{O2}$ |
| Boost (voltage step-up) | $V_{XI}$ = fraction of $V_{IN}$; $V_{XO}$ = 0 | $V_{XI}$ = fraction of $V_{IN}$; $V_{XO}$ = $V_{O1}$ or $V_{O2}$ |
| Buck/boost | $V_{XI}$ = fraction of $V_{IN}$; $V_{XO}$ = 0 | $V_{XI}$ = 0; $V_{XO}$ = $V_{O1}$ or $V_{O2}$ |

In Table 1, the "fraction" at the input-side switch node 222 ($V_{XI}$) depends on the predetermined ratio by which the one or more flying capacitors divide the relevant input voltage. For example, the fraction is ⅓ if the input voltage for the flying capacitor arrangement of the circuit of FIG. 2A. Table 1 shows the simplest case where only one input and output node for the voltage transforming inductor is involved in controlling each inductor pulse. In alternative examples, at least one of: more than one inductor output node or more than one inductor input node can be involved in phase 1 and/or phase 2. For example, $V_{IN,2}$ may additionally have a flying capacitor interface to divide that input voltage at a corresponding second input-side switch node.

Figure 3A:
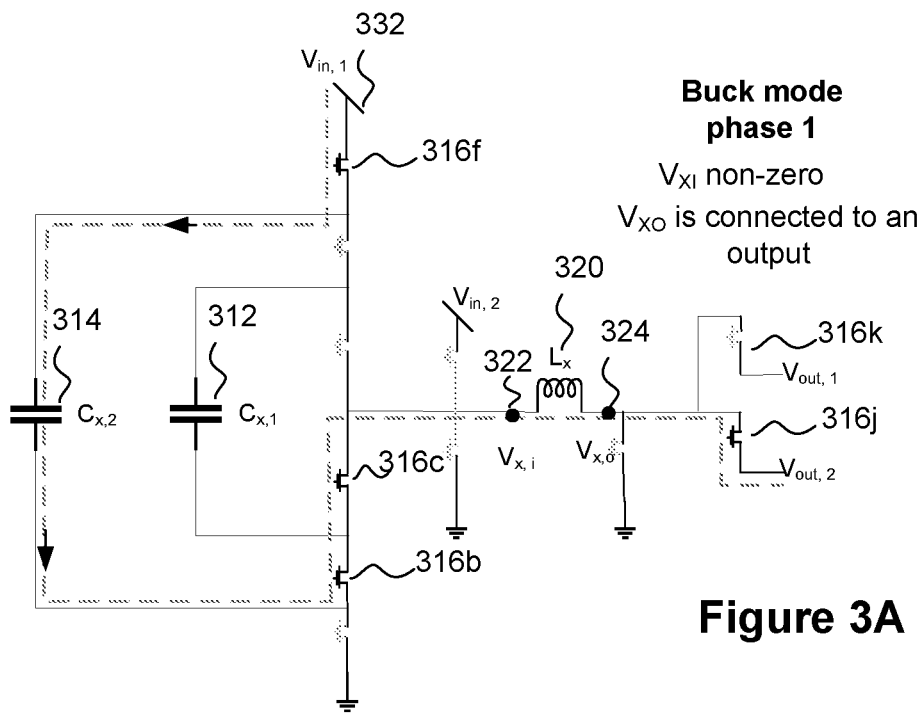
FIG. 3A schematically illustrates a first phase of a buck mode of the multiple output DC to DC voltage converter of FIG. 2A in a first state of three possible states that give rise to (1)/3 VIN, 1 at an input-side switch node of an inductor.
Figure 3B:
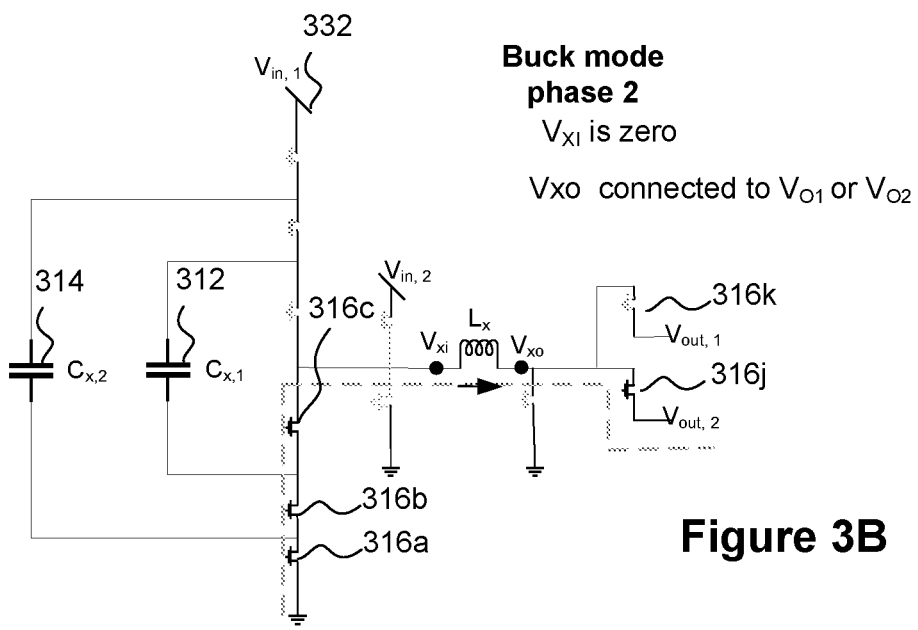
FIG. 3B schematically illustrates a second phase of the buck mode of the multiple output DC to DC voltage converter of FIG. 2A.

FIG. 3A schematically illustrates a first phase of a buck mode of the multiple output DC to DC voltage converter of FIG. 2A in a first state of three possible states that give rise to ⅓ $V_{IN,1}$ at an input-side switch node 322 of an inductor 320. In this first state a first input voltage ($V_{IN,1}$) 332 is divided to provide a fraction of ⅓ $V_{IN,1}$ at the input-side switch node 322 via four switching elements 316b, 316c, 316f and 316j being in an on state and all of the other switching elements being in an off state. With this switching element configuration of on/off, current flows from the first input voltage 332, to charge a flying capacitor 314 and to pass through an inductor 320 to a second voltage output 316j. In this first phase of the buck mode, an input side switching node 322 is at ⅓ $V_{IN,1}$ and an output side switching node 324 is non-zero and connected to one of the multiple outputs 316j, 316k. The second flying capacitor may be charged up to ⅔ $V_{IN,1}$ so subtracting this voltage drop across the capacitor from $V_{IN,1}$ leaves ⅓ $V_{IN,1}$ at the input-side switch node 322. The FIG. 3A switching configuration corresponding to the first state giving rise to ⅓ $V_{IN,1}$ at an input-side switch node 322 may correspond to the first phase of the buck mode or may alternatively correspond to the second phase of the boost mode of Table 1.

FIG. 3B schematically illustrates a second phase of the buck mode of the multiple output DC to DC voltage converter of FIG. 2a. Relative to the switching element configuration of FIG. 3A, only two of the switching elements change on/off status between the first and the second phase. In particular, the switching element 316f coupling the second flying capacitor 314 of the first input voltage 332 is switched off whilst a switching element 316a is switched on, thereby grounding the input-side switch node 322. In this configuration the output-side switching node 324 is non-zero due to the action of the inductor 320 and is connected to one of the two voltage outputs 316k or 316k. Current flows as shown along a path via switching elements 316a, 316b, 316c, the inductor 320 and switching element 316j to the second voltage output $V_{OUT,2}$. In this second phase there is no change to the charges on either of the flying capacitors 312, 314.

Figure 3C:
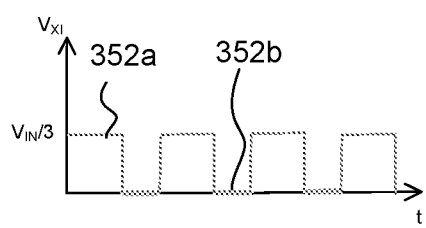

FIG. 3C schematically illustrates an example square wave corresponding to a variation of a voltage on the input-side switch node 322 with time. In particular, a square wave high portion 352a corresponds to the phase 1 circuit configuration of FIG. 3a whilst a square wave low portion 352b correspond to the phase 2 circuit configuration of FIG. 3b.

Figure 4:
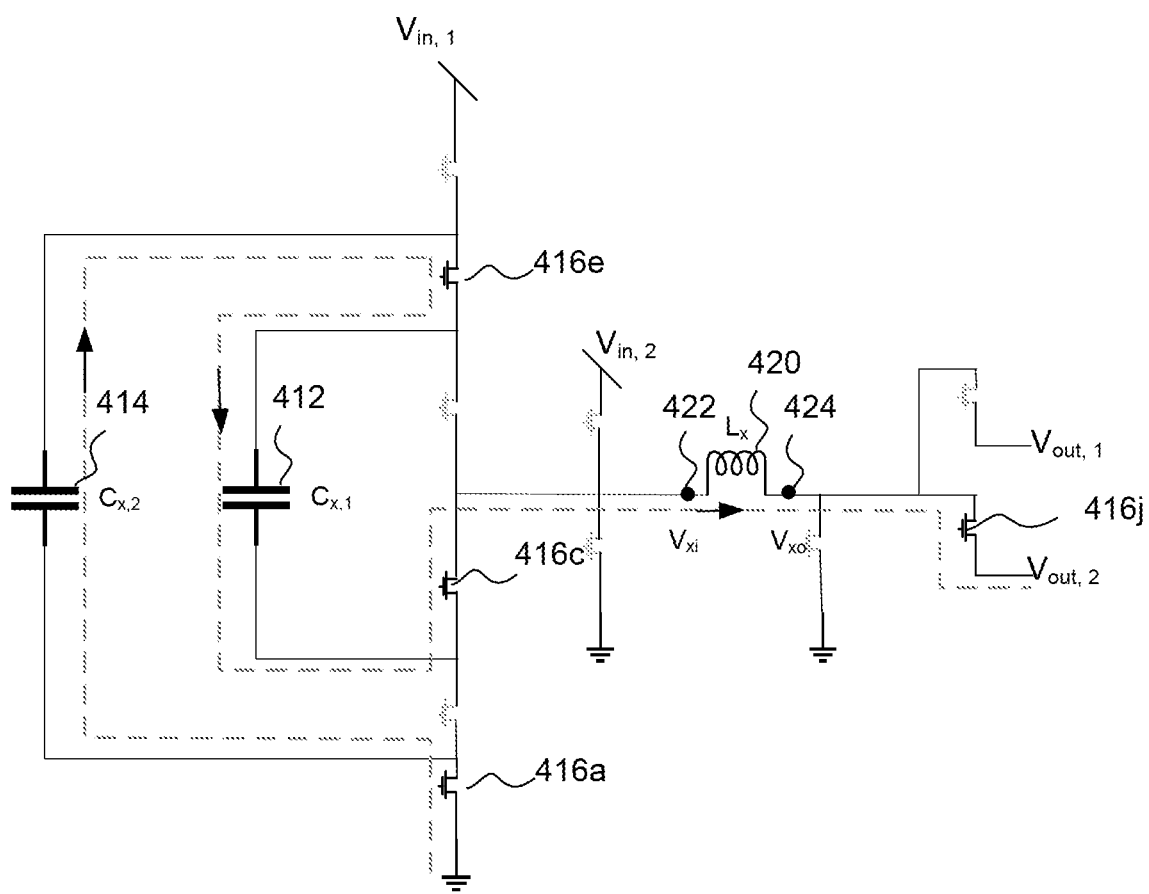
FIG. 4 schematically illustrates a second state of three possible states that give rise to (1)/3 VIN, 1 at an input-side switch node of the multiple output DC to DC voltage conversion circuit of FIG. 2.

FIG. 4 schematically illustrates a second state of three possible states that give rise to ⅓ $V_{IN,1}$ at an input-side switch node 422 (corresponding to 222 in FIG. 2A) of the multiple output DC to DC voltage conversion circuit of FIG. 2A. In this second state, a set of four switching elements 416a, 416c, 416e and 416j is each in an on configuration and all other switching elements illustrated are in an off configuration. This results in a current flowing via a grounded switching element 416a, through a second flying capacitor 414, which discharges from its stored voltage of ⅓ $V_{IN,1}$ through the switching element 416e, supplying charge to increase the charge on the first flying capacitor 412 up to ⅓ $V_{IN,1}$. Current then flows via an inductor 420 to one of the two voltage outputs $V_{OUT,1}$ and $V_{OUT,2}$. In this example, the switch 416j to a second voltage output $V_{OUT,2}$ is on so the current flows there rather than to the first voltage output $V_{OUT,1}$. The voltage at the input-side switch node 422 before the inductor 420 is ⅓ $V_{IN,1}$ in this state because the voltage ⅔ $V_{IN,1}$ on the second flying capacitor 414 which is discharging, drops by ⅓ $V_{IN,1}$ due to charging of the first flying capacitor 412, leaving the other ⅓ $V_{IN,1}$ at the input-side switch node 422. It can be seen from Table 1, that this second state of FIG. 4 may correspond to phase 1 of the buck mode or may alternatively correspond to phase 2 of the boost mode.

Figure 5:
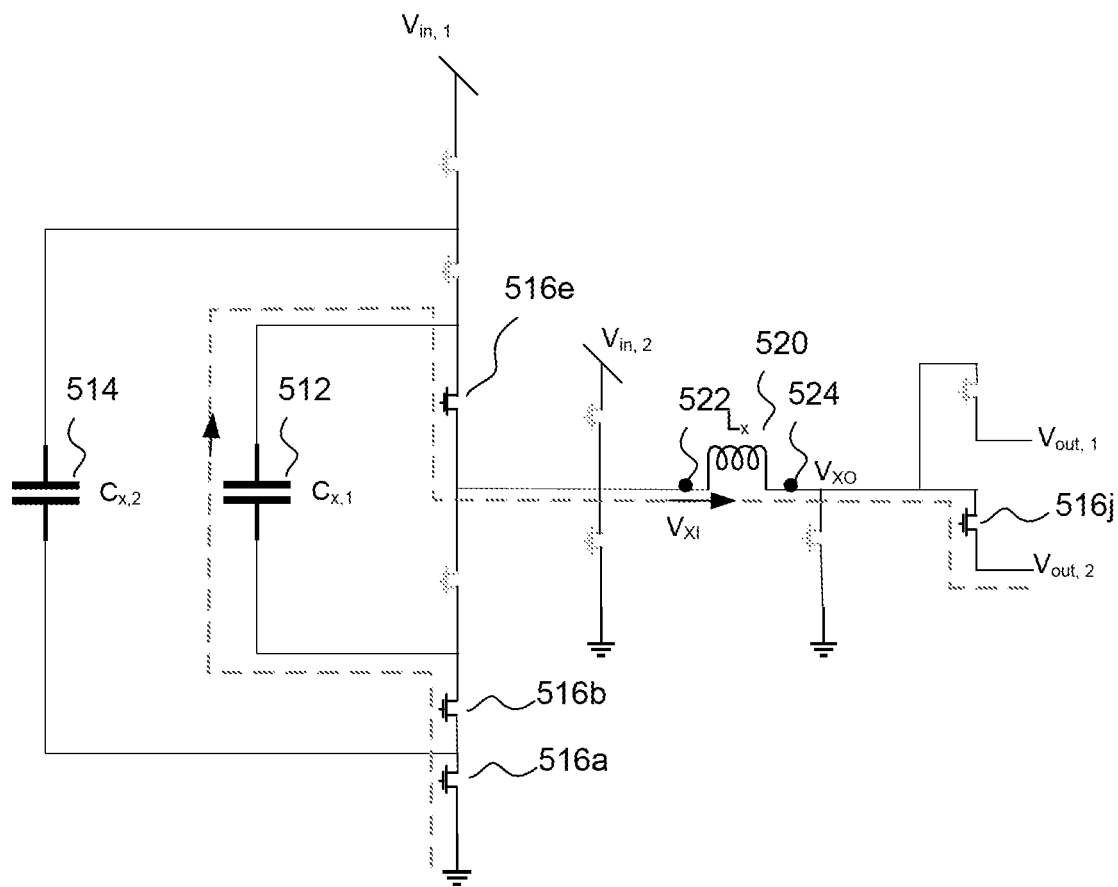
FIG. 5 schematically illustrates a third state of three possible states that give rise to (1)/3 VIN, 1 at an input-side switch node of the multiple output DC to DC voltage conversion circuit of FIG. 2A.

FIG. 5 schematically illustrates a third state of three possible states that give rise to ⅓ $V_{IN,1}$ at an input-side switch node 522 (corresponding to 222 in FIG. 2A) of the multiple output DC to DC voltage conversion circuit of FIG. 2A. In this third state a first flying capacitor 512 is discharging, providing a current through an inductor 520 and connecting an output-side switching node 524 to a second voltage output $V_{OUT,2}$, via a switching element 516j. In this third state, two switching elements 516a and 516b connect one plate of the first flying capacitor 512 to ground. Only four of the switching elements illustrated in FIG. 5 are in an on configuration. In particular, switching elements 516a, 516b 516e and 516j are on. It can be seen from Table 1, that this third state of FIG. 5 may correspond to phase 1 of the buck mode or may alternatively correspond to phase 2 of the boost mode. The second flying capacitor 514 is also present.

The voltage conversion circuit of any one of FIGS. 2 to 5 may be controlled using any of a number of different control schemes such as control in a voltage mode or control in a current mode using one of Continuous Conduction Mode (CCM), Pulse Frequency Modulation (PFM) or Discontinuous Conduction Mode (DCM), for example. In one example, when the voltage converter is operating in the PFM control mode, an inductor current pulse may be triggered each time an output voltage falls below a reference value.

Figure 6A:
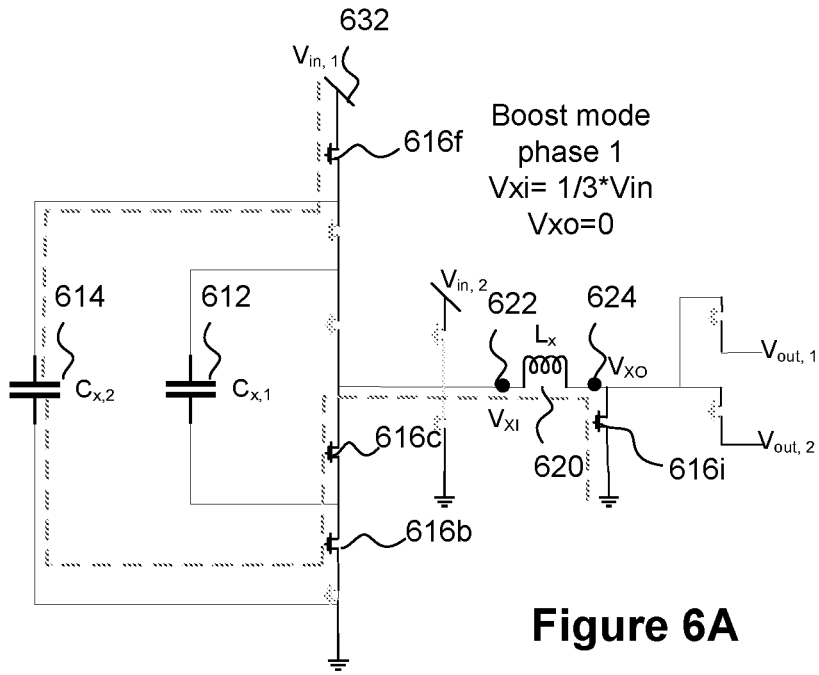
FIG. 6A schematically illustrates a first phase of a boost mode configuration or equivalently, a first phase of a buck-boost mode configuration of the voltage conversion circuit of FIG. 2A.

FIG. 6A schematically illustrates a first phase of a boost mode configuration or equivalently, a first phase of a buck-boost mode configuration of the voltage conversion circuit of FIG. 2A. In this first phase of the boost mode (or buck-boost mode), the input-side switch node voltage 622 is at a fraction of $V_{IN,\ 1}$, in this example, $\frac{1}{3}V_{IN,\ 1}$, whereas an output-side switching node voltage 624 ($V_{XO}$) is at a zero voltage due to having a path to ground via a switching element 616$i$ at an output side of an inductor 620. In this example, similar to the FIG. 3$a$ example, a second flying capacitor 614 is coupled to a first input voltage $V_{IN,\ 1}$ 632 and is charging up to $\frac{2}{3}V_{IN,\ 1}$, resulting in a voltage drop of the same value relative to $V_{IN,\ 1}$, leaving a voltage of $\frac{1}{3}V_{IN,\ 1}$, at the input-side switch node 622. In contrast to phase 1 of the buck mode of FIG. 3$a$, in the FIG. 6A example, the output-side switching node voltage 624 is grounded and not connected to one of the voltage outputs. The first flying capacitor 612 is also present. The switching elements 616$f$, 616$c$ and 616$b$ are in an on configuration.

Figure 6B:
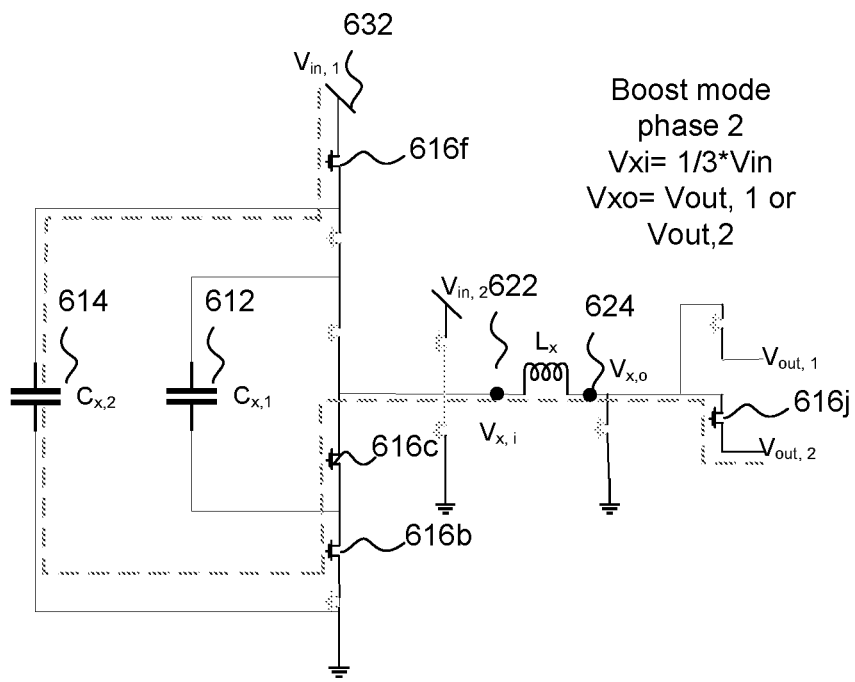
FIG. 6B schematically illustrates a second phase of a boost mode configuration of the voltage conversion circuit of FIG. 2A.

FIG. 6B schematically illustrates a second phase of a boost mode configuration of the voltage conversion circuit of FIG. 2A. Similarly to the configuration of the first phase of boost mode is illustrated in FIG. 6A, the second flying capacitor 614 is charging up to $\frac{2}{3}V_{IN,\ 1}$, resulting in a voltage drop of the same value relative to $V_{IN,\ 1}$, leaving a voltage of $\frac{1}{3}V_{IN,\ 1}$, at the input-side switch node 622. However, instead of connecting the output-side switching node 624 to ground, it is connected to one of the two voltage outputs, in this case to $V_{OUT,\ 2}$ via a switching element 616$j$ being in an on state. Theoretically, the boost mode can produce an infinitely high output voltage, but in practical terms a desired boost relative to a voltage at the input-side voltage node can be achieved by suitably adjusting durations and relative durations of the two phases. For example, if phase 1 is very long and phase 2 is comparatively very short then a large step-up in voltage should be achievable. The basic principle of the boost mode is that a current through the inductor should reach the same value at the end of phase 2 of the boost mode that it had at the beginning of phase 1 of the boost mode. The characteristic behavior of the circuit in boost mode is that if phase 1 is long and phase 2 comparatively short, then an output voltage should be much higher than the input voltage.

Figure 7A:
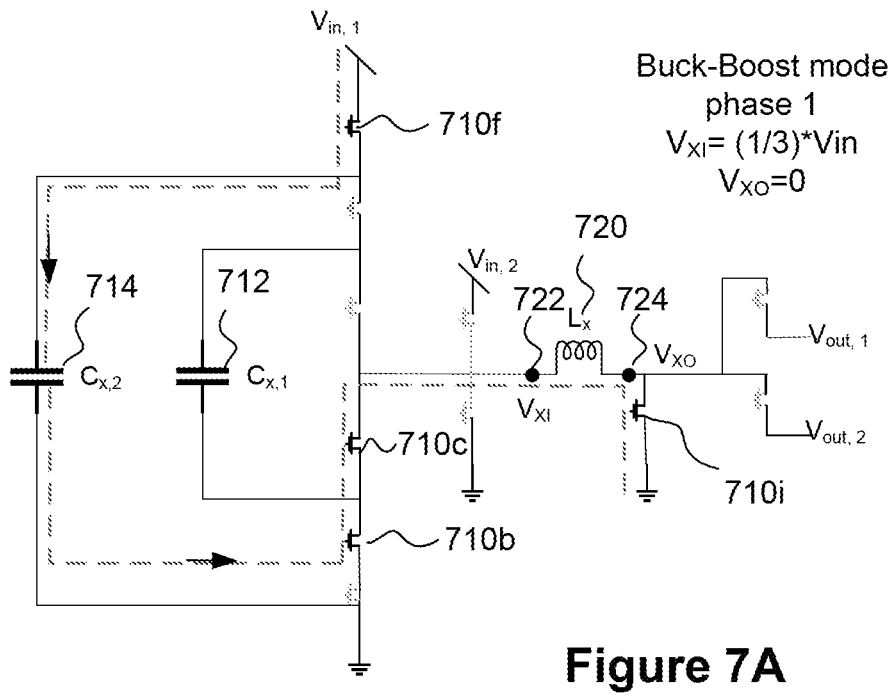
FIG. 7A is identical to FIG. 6A and represents a first phase of a buck-boost mode configuration of the voltage conversion circuit of FIG. 2A.

FIG. 7A is identical to FIG. 6A and represents a first phase of a buck-boost mode configuration of the voltage conversion circuit of FIG. 2A. Thus the first phase of the boost mode is identical to the first phase of the buck-boost mode in these example arrangements. The switching elements 710$f$, 710$c$, 710$b$ and 710$i$ are in an on configuration. The first flying capacitor 712 and the second flying capacitor 714 are also present.

Figure 7B:
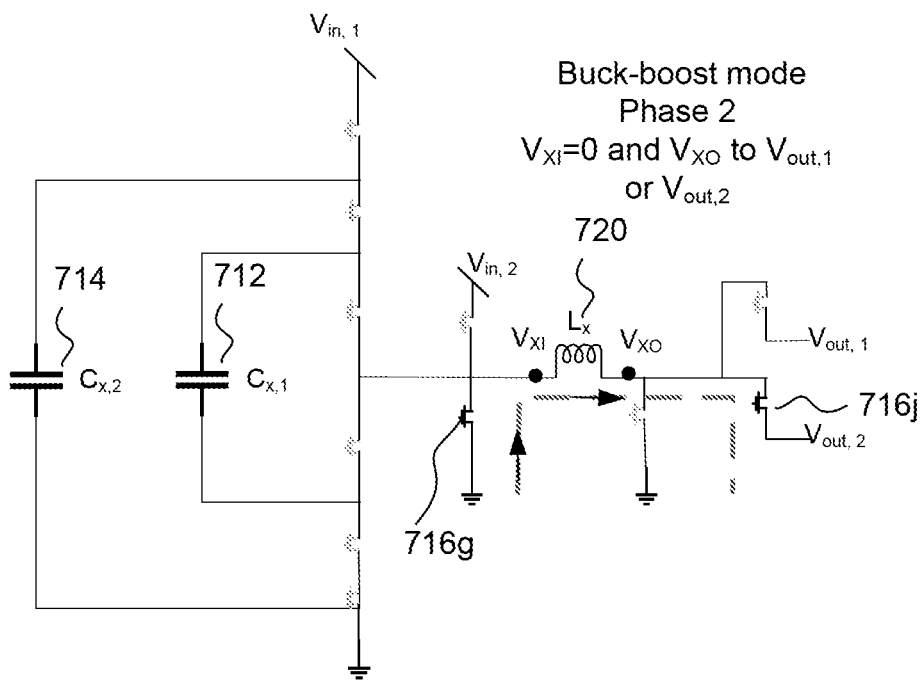
FIG. 7B schematically illustrates a second phase of a buck-boost mode configuration of the voltage conversion circuit of FIG. 2A.

FIG. 7B schematically illustrates a second phase of a buck-boost mode configuration of the voltage conversion circuit of FIG. 2A. In this configuration the input-side switch node 722 is at a zero voltage due to a switching element 716$g$ being switched on and an output-side switching node 724 is connected to the voltage output $V_{OUT,\ 2}$ via the switching element 716$j$ and is at a non-zero value due to current flowing through the inductor 720. In the buck-boost mode of FIGS. 7A and 7B, the first phase (FIG. 7A) is an "energy storing" or "inductor energizing" phase whereas the second phase (FIG. 7B) is an "energy release" or "inductor deenergizing" phase. A step-up in voltage may be achieved by increasing the energy storing phase relative to the energy release phase. A step-down in voltage maybe achieved by increasing a duration of the energy release phase relative to the energy storing phase.

In an alternative example of the buck-boost mode of the voltage conversion circuitry to the example of FIGS. 7A and 7B, the input-side switch node 722 connections are as for FIGS. 7A and B and as described above but the output-side switch node 724 connections are different For the alternative buck-boost mode example, considering first the buck-boost mode implemented to provide a step-down in voltage. In the energy-storing phase (phase 1) of the, instead of being connected to ground via the switching element 710$i$ (as in FIG. 7A), the output-side switch node 724 may be connected to any one of a plurality of voltage output ports corresponding to voltage levels lower than a voltage at the input switch node 722 in the same phase (i.e. lower than the predetermined fraction of $V_{IN,\ 1}$). Then during an energy-release phase, the output switch node 724 may be connected to any one of a plurality of output voltage ports associated with voltages lower than the voltage at the input switch node 722 in phase 1.

Considering next the buck-boost mode implemented to provide a step-down in voltage. In an energy-storing phase (phase 1), instead of being limited to a ground connection only (as in FIG. 7A), the output switch node 724 may be connected to ground or to any one of a plurality of output ports associated with voltages lower than a voltage at the input-side switch node 722 (in phase 1). Then during an energy release phase (phase 2) of the boost mode, the output switch node 724 may be connected to any one of a plurality of voltage ports associated with a respective voltage that is higher than a voltage at the input switch node 722 in phase 1. Recall that in phase 1, the input voltage $V_{IN,\ 1}$ is divided by the flying capacitor(s) to provide a fraction of $V_{IN,\ 1}$ at the input switch node 722.

Balancing of the flying capacitor voltages of the circuit of FIG. 2A is one of the main challenges in this architecture. According to the present technique, this challenge has been addressed by implementing a low-complexity solution which can maintain flying capacitor voltages at their nominal values in a wide range of different operating conditions. One solution comprises carefully defining and selecting a sequence of states of the flying capacitor voltage conversion interface. For example, if a voltage of the first flying capacitor ($Cx_1$) 212 is measured and found to be too high, then a state where the first capacitor $Cx_1$ is discharged may be selected next in the sequence. This method is straightforward to implement because it involves simply sampling of the flying capacitor voltage(s) and the input voltage prior to each switching transition that results in charging or discharging of a flying capacitor, to determine the appropriate state. The plurality of predetermined circuit states in the sequence is selected such that in a complete cycle through any sequence of the plurality of predetermined states any one switch of the flying capacitor interface changes state no more than once. This may apply regardless of the number of flying capacitors implemented in the voltage conversion circuit.

Figure 8:
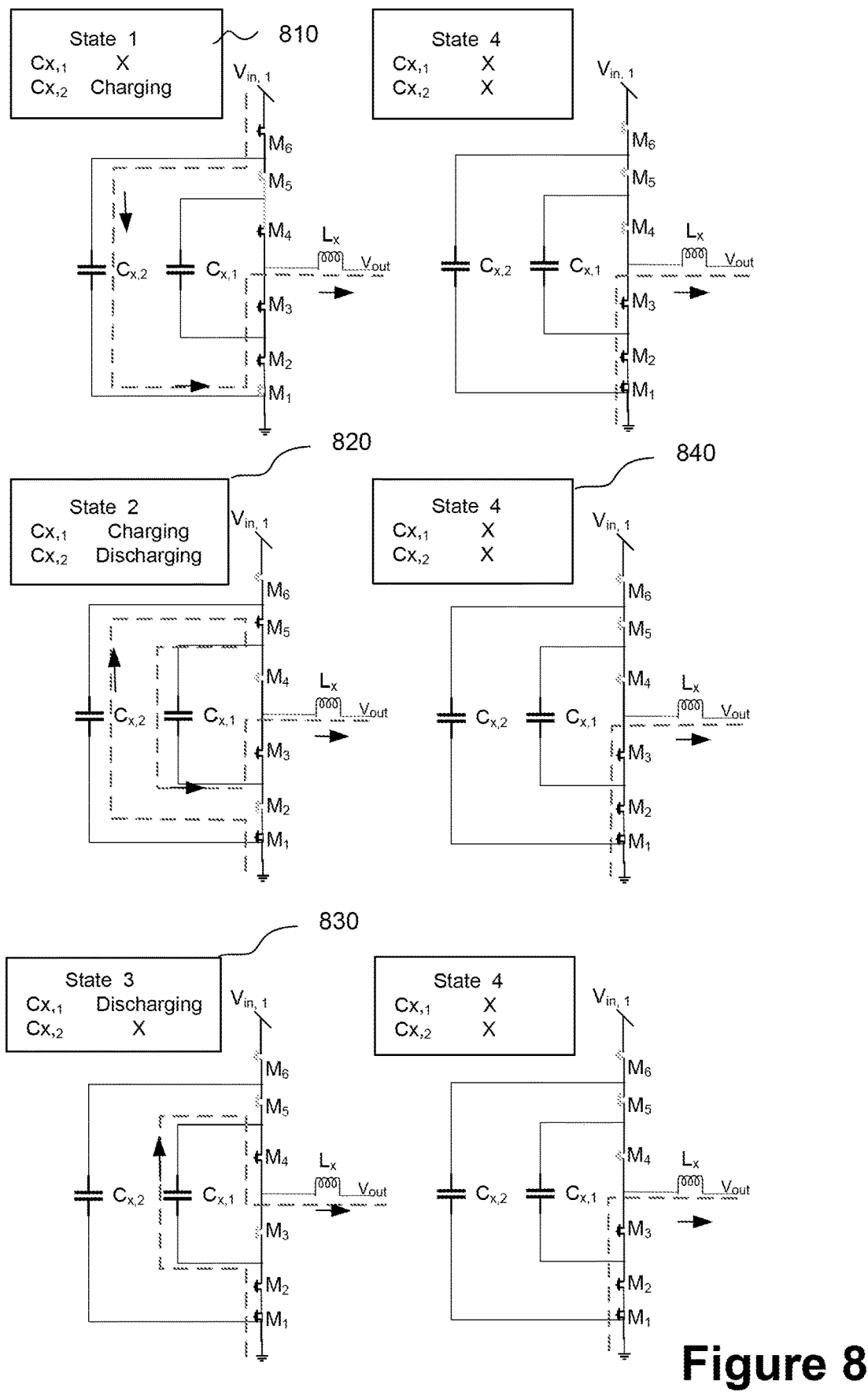
FIG. 8 schematically illustrates a sequence of states to balance flying capacitor voltages in the voltage conversion circuit.

FIG. 8 schematically illustrates a sequence of states to balance flying capacitor voltages in the voltage conversion circuit of the examples. The sequence of states starts at state 1 and alternates between a state putting the input-side switch node at a fraction (⅓ in this example) of the associated input voltage and a state connecting the input-side switch node to ground, which is "state 4". The sequence comprises: state 1, state 4, state 2, state 4, state 3, state 4. State 4 follows after each of the states 1, 2, or 3 regardless of the sequence and as shown in box 840 in FIG. 8, state 4 does not contribute to charging or discharging of either of the two flying capacitors. As shown in FIG. 8, in "state 1" as shown in box 810 the second flying capacitor $C_{X,2}$ is charging, whilst the first flying capacitor $C_{X,1}$ is switched out of the circuit. In "state 2" 820, the first flying capacitor $C_{X,1}$ is charging, whilst the second flying capacitor $C_{X,2}$ is simultaneously discharging. In "state 3" 830, the first flying capacitor $C_{X,1}$ is discharging, whilst the second flying capacitor $C_{X,2}$ is neither charging nor discharging. State 1 810 of FIG. 8 corresponds to FIG. 3a, state 2 corresponds to FIG. 4 and state 3 corresponds to FIG. 5 when the output-side switch node is connected to one of the voltage outputs. This may correspond to phase 1 of the buck mode or to phase 2 of the boost mode. However, from Table 1 it can be seen that each of these same three states 810, 820, 830 may apply to boost mode phase 1 or buck-boost mode phase 1 when the output-side switch node is connected to ground.

In the sequence of states of FIG. 8, each flying capacitor has only a single charged state and a single discharged state across the sequence. Furthermore, a transition from any one state in FIG. 8 to any next state involves only two switches changing their on/off status. Furthermore, any individual switching element of the circuit of FIG. 8 is switched on and off no more than once in a single cycle through the sequence of all states. This means than an effective switching frequency of the circuit of FIG. 8 when implemented, for example, in a buck mode, is lower than would be the case for a previously known buck converter implemented without any flying capacitors. Thus the voltage conversion circuit according to the present technique is likely to be more efficient than previously known converters performing a comparable voltage conversion operation and is capable of performing self-tuning to balance voltages on flying capacitors to appropriately select a next state from a sequence of alternative states.

Table 2 below provides examples of voltage measurements on each of the two flying capacitors of the circuit of FIG. 2A and a next state from the sequence of FIG. 8 chosen in response to the sampled voltages. Note that an input voltage corresponding to the flying capacitors may also be sampled to determine if each flying capacitor voltage is at, above or below its nominal (i.e. target) voltage level.

TABLE 2

| First flying capacitor $C_{X,1}$ | Second flying capacitor $C_{X,2}$ | Next State |
|---|---|---|
| Low (<⅓ $V_{IN}$) | Low (<⅔ $V_{IN}$) | 1 ($C_{X,2}$ charging) |
| Low (<1/3 $V_{IN}$) | High (>⅔ $V_{IN}$) | 2 ($C_{X,1}$ charging and $C_{X,2}$ discharging) |
| High (>⅓ $V_{IN}$) | Low (<⅔ $V_{IN}$) | 3 ($C_{X,1}$ discharging) |
| High (>⅓ $V_{IN}$) | High (>⅔ $V_{IN}$) | 3 ($C_{X,1}$ discharging) |

Note that not all of the measured current states correspond to one of the states 1, 2, 3 or 4 of FIG. 8, but Table 2 covers all possible conditions because a controller of the voltage converter, which selects a next state and controls modes and phase timings in each mode, should be able to make a choice of a next appropriate voltage converter state even if the combination of first and second flying capacitor voltages should not occur in normal operation. An example time sequence with an arbitrary starting state is schematically illustrated in FIG. 9.

Performing balancing of voltages on the flying capacitors by sampling the capacitor voltages and dynamically selecting a next state from a sequence of states helps to ensure that the square wave formed at the input-side switch node 222 is undistorted. Any drift of the flying capacitors from their respective nominal voltages may cause distortion of the voltage at the input-side switch node, potentially making the voltage conversion less accurate. Capacitor balancing may be improved by going through the sequence of states of FIG. 8 returning to the initial state to complete one full cycle of state transitions.

Figure 9:
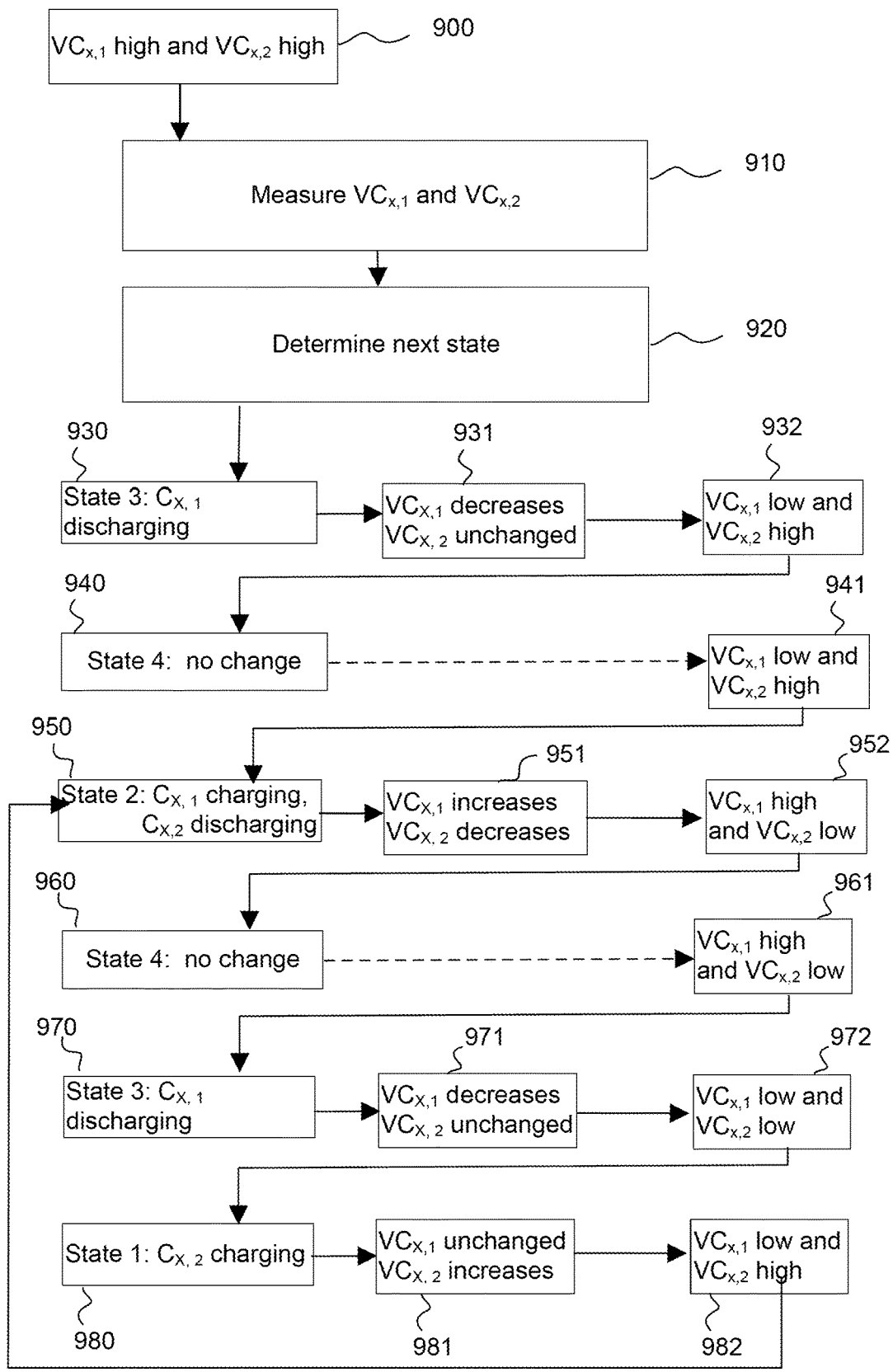
FIG. 9 is a flowchart that schematically illustrates the operation of the voltage conversion circuitry in one embodiment for maintaining the voltages across the first and second flying capacitors at the predetermined values.

FIG. 9 is a flowchart that schematically illustrates the operation of the voltage conversion circuitry in one embodiment for maintaining the voltages across flying capacitors $C_{X,1}$ and $C_{X,2}$ at the predetermined values.

At element 900 the voltages across the conductors have reached values that are not within the normal operating parameters. The voltages across the two flying capacitors, $C_{X,1}$ and $C_{X,2}$, should be held fixed at nominal, predetermined, values in order to divide the input voltage by a predetermined amount so as to achieve the sought step-down from the input voltage at the input-side switch node of the inductor. However, the voltages on the capacitors may be subject to drift during operation. This drift in the voltages across the capacitors may be corrected in order to achieve more efficient operation of the voltage conversion circuitry.

At element 910 the voltages across the flying capacitors $C_{X,1}$ and $C_{X,2}$ are measured by e.g. sensing the input voltage or sensing the current waveform to the capacitors.

A state of the voltage conversion circuitry is defined by the charging/discharging mode of each of the flying capacitors. During operation the circuitry may proceed through a sequence comprising a plurality of different states in a time sequence. One cycle of the voltage conversion circuitry is defined such that the net current flow through each capacitor is equal to zero, thus e.g if one of the flying capacitors is charged, it is also be discharged within the same cycle.

From a given starting condition (such as element 900) the next state of the voltage conversion circuitry within its cycle can be determined at element 920. This determination ensures that: the voltage across each of the flying capacitors will be returned to or maintained at the nominal voltage; that the net current flow in the full cycle will be zero; and that if the voltage on a given capacitor is already above or below its nominal value, that the voltage on that capacitor will not be further increased or decreased in a next state as this would drive the voltage further from its required value. The states of FIG. 9 are as numbered and as defined in Table 2.

It is determined that from the starting condition of 900, the next state for the conversion circuitry at element 930 should be state 3. This determination is based on the voltages across both capacitors exceeding the predetermined value at element 910, thus both the voltages should ideally be lowered. It is determined that at 930 this can only be achieved in a first state change by discharging $C_{X,1}$, as discharging $C_{X,2}$ in this state change would result in an increase in the voltage across $C_{X,1}$, which is not consistent with the requirements for most efficient operation of the circuitry.

Having discharged the first flying capacitor $C_{X,1}$ at element 930, the voltage across $C_{X,1}$ at element 931 decreases, and the voltage across $C_{X,2}$ remains unchanged. Thus, at element 932 it can be seen that the voltage on $C_{X,1}$ may now be lower than the nominal value set for $C_{X,1}$, and the voltage across $C_{X,2}$ remains higher that its nominal value.

It is considered that at element 940 the next state of the voltage conversion circuitry should be state 4 which is an intermediate state. By entering state 4 between each charging or discharging state of a flying capacitor, it can be arranged that only two switching elements of the plurality of switching elements of the voltage conversion circuitry are to be operated (switched) for each state change. Thus, by entering state 4 between each capacitor charging/discharging state (states 1, 2 and 3) the number of switching elements turned on or off to provide the state change is reduced, resulting in lower losses.

At element 941, after a change to state 4, the voltages on the capacitors are unchanged, the voltage across $C_{X,1}$ is low in comparison to its predetermined value, and the voltage across $C_{X,2}$ is high.

In order to restore the voltages on both capacitors to their predetermined nominal values it is determined that at element 950 the next state of the conversion circuitry should be changed to state 2. This determination arises because it is only possible to lower the voltage across $C_{X,2}$ by discharging $C_{X,2}$. As a consequence of the voltage conversion circuitry configuration, $C_{X,1}$ is then charged. Thus, at element 951 the voltage across $C_{X,2}$ decreases as the capacitor is discharged, and the voltage across $C_{X,1}$ increases as a result of $C_{X,1}$ charging. Hence, at element 952, the voltage across $C_{X,1}$ is now higher than its nominal predetermined value, and the voltage across $C_{X,2}$ is below its respective nominal value.

The circuitry then enters state 4 at element 960, as described above, which results in no change to the voltages across each of the capacitors, 961.

Upon entering element 970 the state of the circuitry is changed to state 3, as it has been determined that the voltage on $C_{X,1}$ should ideally be reduced and the voltage on $C_{X,2}$ should be kept unchanged in this state change so as to allow further state changes to better compensate for voltage offsets. The change of state at element 970 results in a voltage across $C_{X,1}$ which is too low in comparison to the predetermined value. This is also the case for the voltage across $C_{X,2}$ (972). At element 971, $VC_{X,1}$ decreases and $VC_{X,2}$ is unchanged.

At element 980 a final state change for the cycle of the circuitry is conducted. The change to state 1 requires $C_{X,2}$ to be charged. After element 980, the state change sequence will be repeated again from element 950 onwards. At element 981, $VC_{X,1}$ is unchanged and $VC_{X,2}$ increases. At element 982, $VC_{X,1}$ is low and $VC_{X2}$ is high. Thus, for each of the flying capacitors of the flying capacitor interface there will be an equal number of charging and discharging events. In this way, the next state determination of FIG. 9 allows the voltages across the flying capacitors to be brought from a starting condition outside of normal operation to within the operational range of the predetermined values, these values being maintained by a sequence of state changes selected from a predetermined plurality of states.

Figure 10:
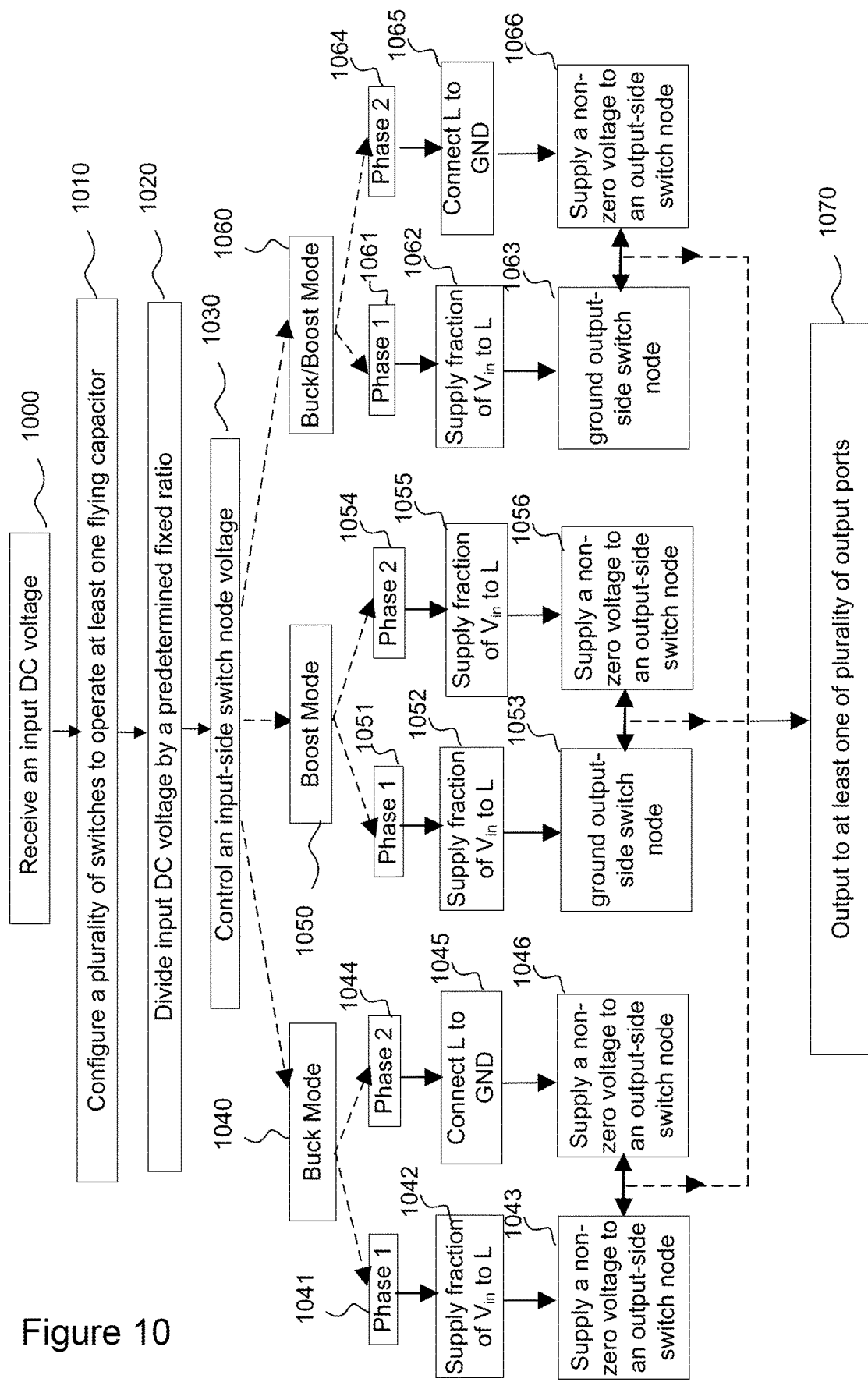

FIG. 10 depicts a flowchart that schematically illustrates a method for converting at least one input DC voltage to a plurality of different output DC voltage levels.

At element 1000 an input DC voltage is supplied to the voltage conversion circuitry by either a primary power source e.g. lithium ion battery, or by a secondary voltage source e.g. solar-powered energy source although any power source may be used.

At element 1010 the plurality of switching elements of the flying capacitor interface may be configured to connect at least one flying capacitor in series between the input voltage and the input-side switch node of the inductor, for example, to charge one flying capacitor or to charge one flying capacitor via discharge of another flying capacitor (see FIG. 8). Additional flying capacitors may also be connected in parallel. Alternatively, the at least one flying capacitors may be connected between ground and the input-side switch node of the inductor (to discharge one or more flying capacitors). The configuration of the switching elements to connect the at least one flying capacitor between either the input voltage and the input-side switch node of the inductor, or between ground and the input-side switch node of the inductor provides two phases of operation for the voltage dividing circuitry and allows the at least one flying capacitor to be charged or discharged.

The switching elements of the flying capacitor interface may be connected such that the switching elements in an 'on' state may be connected in series between the input voltage or ground, the at least one flying capacitor and the input-side switch node of the inductor. In this case the voltage across each switching element is the same. By configuring the switching elements such that the switches in an 'on' state are in series with the at least one flying capacitor when the flying capacitor interface is operated, as well as serving to divide the input voltage at the input-side switch node of the inductor to a fraction of the input voltage, the voltage across each of the plurality of switches is also reduced. This allows for the use of switching elements, such as transistors, with the same, low, voltage rating. Reducing the voltage requirements of the switching devices results in higher switching speeds with small passive components, solving the problem of large die space required for power conversion circuitry and also improving operation efficiency due to the increase in switching speeds.

At element 1020 the input DC voltage is divided by a predetermined fixed ratio by operating the at least one flying capacitors. The division of the input DC voltage may be achieved as illustrated in any of the embodiments of FIGS. 3, 4, and 5 to divide the input voltage by ⅓. Different fractions of the input DC voltage may be provided by the flying capacitor interface at the input-side switch node, depending on the number and arrangement of the flying capacitors.

At element 1030 the voltage across the input-side switch node is controlled. The voltage across the input-side switch node may be set to zero by connecting the input-side switch node to ground, or may be set to non-zero by connecting the input-side switch node to the flying capacitor interface. Different modes of operation of the voltage dividing circuitry include buck, boost and buck-boost modes. At elements 1040, 1050 and 1060 these modes and their associated phases are operated by controlling timings of transitions between distinct circuit phases of operation and controlling voltages at the input-side switch node and the output side-switch node of the inductor via on and off settings of the various switching elements.

For example, at element 1040 the voltage dividing circuitry is configured to operate in buck mode. Buck mode operation comprises two phases, as illustrated in FIGS. 3A and 3B. Phase one 1041 is operated by supplying the input-side switch node of an inductor with a non-zero voltage provided by the flying capacitor interface 1042. This corresponds to a peak in the square wave generated by the flying capacitor interface, but the magnitude of the peak is divided by the flying capacitor interface to be a fraction less than the input voltage to the flying capacitor interface (e.g. $V_{IN}/3$ as shown in the FIG. 3C example). In this phase the inductor then supplies a non-zero voltage across an output-side switch node of the inductor. In phase two at process element 1044, the input-side switch node of the inductor is connected to ground, providing zero voltage across the node at process element 1045. This corresponds to the minimum 352*b* of the square wave generated by the flying capacitor interface, as illustrated in FIG. 3C.

In buck mode 1040 the inductor serves as a filter for the square-wave voltage supplied at the input-side switch node. As the plurality of switching elements of the flying capacitor interface are operated to change the voltage across the input-side switch node from, for example, a non-zero divided voltage (a fraction less than one of the input voltage) to ground, or vice-versa, the inductor will experience a change in the voltage across it. This change in the voltage on the inductor due to the change in the state of the switching circuitry results in an effective resonance between the inductor and the flying capacitor. Thus, the square-wave voltage at the input-side switch node is filtered and a stepped-down, non-zero, DC voltage is supplied by the inductor to an output-side switch node 1043, 1046. The relative duration of the voltage division circuitry in the two phases of the buck mode determines the step-down in voltage that is provided. In buck mode a long duration in phase two relative to phase one provides a larger step-down in voltage.

In boost mode at process element 1050, phase one 1051 is operated by supplying a non-zero voltage to the input-side switch node of the inductor from the flying conductor interface 1052 and the voltage across the output-side switch node of the inductor is set to zero by connecting it to ground 1053. In this connection arrangement the inductor is in an energy storing configuration. In phase two 1054 of boost mode operation 1050, the voltage across the input-side switch node of the inductor is set to non-zero by connecting the node to the flying capacitor interface 1055. The output-side switch node of the inductor in phase two is connected to at least one of the plurality of outputs. Thus, the voltage across the output-side switch node of the inductor is non-zero 1056. In this phase the inductor is in an energy release configuration. A step-up in voltage may be achieved by increasing the energy storing phase relative to the energy release phase, i.e. by increasing the duration of phase one relative to phase two of the boost mode at element 1050.

In buck-boost mode 1060, phase one at element 1061 may be identical to phase one 1051 of the boost mode 1050, where the input-side switch node is supplied with a non-zero voltage (of reduced magnitude relative to the input voltage) from the flying capacitor interface 1062, and the voltage across the output-side switch node of the inductor is set to zero by connecting it to ground 1063. Alternatively, at element 1061 in phase one the buck-boost mode the output-side switch node of the inductor may be connected to a voltage output corresponding to a voltage lower than the voltage at input-side switch node in phase 1. Phase one of the buck-boost mode is thus an energy storing phase of the inductor. At process element 1064, in phase two of the buck-boost mode, an energy releasing phase of the inductor, the voltage across the input-side switch node of the inductor is set to zero by connecting it to ground at element 1065, as illustrated in FIG. 7B, and the output-side switch node of the inductor is supplied with a non-zero voltage 1066 due to current flowing through the inductor.

The timings of transitions between phase one 1061, the energy storing phase, and phase two 1064, the energy-release phase, are controlled to provide at the output-side switch node, either a step-up in voltage or a step-down in voltage relative to the predetermined fixed ratio of the input DC voltage at the input-side switch node. Thus, by varying the relative durations of phase one 1061 and phase two 1064, or the duty cycle of the phase one switch configuration and the phase two switch configurations, the voltage dividing circuitry may be changed from a buck to a boost mode of operation, or vice versa.

By changing the mode of operation of the voltage conversion circuitry by adjusting timings of the two phases without specifically controlling the switching elements specifically for buck or for boost operation, an improvement in operational efficiency can be achieved.

At element 1070 the output-side switch node of the inductor may be connected to a plurality of output devices. The voltage output circuitry comprising a plurality of switching elements may be arranged to provide a voltage to a plurality of devices in either series or parallel.

In this specification, the phrase "at least one of A or B" and the phrase "at least one of A and B" and should be interpreted to mean any one or more of the plurality of listed items A, B etc., taken jointly and severally in any and all permutations.

Where functional units have been described as circuitry, the circuitry may be general purpose processor circuitry configured by program code to perform specified processing functions. The circuitry may also be configured by modification to the processing hardware. Configuration of the circuitry to perform a specified function may be entirely in hardware, entirely in software or using a combination of hardware modification and software execution. Program instructions may be used to configure logic gates of general purpose or special-purpose processor circuitry to perform a processing function.

Circuitry may be implemented, for example, as a hardware circuit comprising processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate arrays (FPGAs), logic gates, registers, semiconductor devices, chips, microchips, chip sets, and the like.

The processors may comprise a general purpose processor, a network processor that processes data communicated over a computer network, or other types of processor including a reduced instruction set computer RISC or a complex instruction set computer CISC. The processor may have a single or multiple core design. Multiple core processors may integrate different processor core types on the same integrated circuit die Machine readable program instructions may be provided on a transitory medium such as a transmission medium or on a non-transitory medium such as a storage medium. Such machine readable instructions (computer program code) may be implemented in a high level procedural or object oriented programming language. However, the program(s) may be implemented in assembly or machine language, if desired. In any case, the language may be a compiled or interpreted language, and combined with hardware implementations.

Embodiments of the present invention are applicable for use with all types of semiconductor integrated circuit ("IC") chips. Examples of these IC chips include but are not limited to processors, controllers, chipset components, programmable logic arrays (PLAs), memory chips, network chips, and the like. In some embodiments, one or more of the components described herein may be embodied as a System On Chip (SOC) device. A SOC may include, for example, one or more Central Processing Unit (CPU) cores, one or more Graphics Processing Unit (GPU) cores, an Input/Output interface and a memory controller. In some embodiments a SOC and its components may be provided on one or more integrated circuit die, for example, packaged into a single semiconductor device.

EXAMPLES

The following numbered examples pertain to further embodiments.

1. Voltage dividing circuitry for use in a voltage converter for converting at least one input Direct Current, DC voltage to a plurality of output DC voltages, the voltage dividing circuitry comprising:
a voltage input port to receive an input DC voltage;
an inductor having an input-side switch node and an output-side switch node, wherein the output side switch node is connectable to one of a plurality of voltage output ports to supply a converted value of the input DC voltage as an output DC voltage; and
a flying capacitor interface having a plurality of switching elements and at least one flying capacitor, the flying capacitor interface to divide the input DC voltage to provide a predetermined fixed ratio of the input DC voltage at the input-side switch node of the inductor.

2. Voltage dividing circuitry may be the subject matter of example 1, the voltage dividing circuitry is arranged to alternately connect the input-side switch node of the inductor to the predetermined fixed ratio of the input DC voltage during a first phase of operation and to the ground during a second phase of operation.

3. Voltage dividing circuitry may be the subject matter of example 1, wherein the voltage dividing circuitry comprises an inductor grounding switching element arranged to alternately connect the output-side switch node of the inductor to the ground in a first phase of operation and to one of the plurality of voltage output ports in a second phase of operation.

4. Voltage dividing circuitry may be the subject matter of any one of examples 1 to 3, wherein the flying capacitor interface comprises a plurality of switching elements connected in a series array with the input DC voltage and wherein each of the at least one flying capacitor is connected across a respective number of the switching elements of the series array to provide, upon charge or discharge of at least a subset of at least one the flying capacitor(s), the predetermined fixed ratio of the input DC voltage at the input-side switch node.

5. Voltage dividing circuitry may be the subject matter of example 4, wherein the plurality of switching elements of the series array of the flying capacitor interface each has an equal share of the input DC voltage such that the predetermined ratio for each of the at least one flying capacitor(s) is a ratio of a number of switching elements across which the flying capacitor is connected to the total number of switching elements in the series array.

6. Voltage dividing circuitry may be the subject matter of any one of examples 2 or 3, adapted to receive control signals to control timings of transitions between the first phase and the second phase.

7. Voltage dividing circuitry may be the subject matter of example 3, comprising a boost converter mode in which the output DC voltage received at the output-side switch node for supply to one of the voltage output ports is stepped-up relative to the predetermined fixed ratio of the input DC voltage at the input-side switch node.

8. Voltage dividing circuitry may be the subject matter of example 2, comprising a buck converter mode in which the output DC voltage received at the output-side switch node for supply to one of the voltage output ports is stepped-down relative to the predetermined fixed ratio of the input DC voltage at the input-side switch node.

9. Voltage dividing circuitry may be the subject matter of example 7, wherein in the first phase of the boost converter mode the input-side switch node is held at a voltage equal to the predetermined fixed ratio of the input DC voltage and wherein in the second phase of the boost converter mode the input-side switch node is held at a zero voltage.

10. Voltage dividing circuitry may be the subject matter of example 8, wherein in both the first phase of the buck converter mode and the second phase of the buck converter mode the output-side switch node is connected to one of the plurality of voltage output ports.

11. Voltage dividing circuitry may be the subject matter of example 1, comprising a buck-boost mode in which a first phase of operation is an energy-storing phase of the inductor and in which a second phase is an energy-releasing phase of the inductor and wherein in the energy storing phase the output-side switch node of the inductor is connected either to ground or to one of the plurality of voltage output ports corresponding to a higher voltage than a voltage at the input-side switch node and wherein in the energy releasing phase the output-side switch node of the inductor is connected to one of the plurality of voltage output ports.

12. Voltage dividing circuitry may be the subject matter of example 11, wherein timings of transitions between the energy storing phase and the energy-release phase are controlled to provide at the output-side switch node, depending on the relative timings, either a step-up in voltage or a step-down in voltage relative to the predetermined fixed ratio of the input DC voltage at the input-side switch node.

13. Voltage dividing circuitry may be the subject matter of example 12, wherein the relative timings of the transitions between the energy-storing phase and the energy releasing phase are controlled to provide a step-up voltage conversion and the voltage dividing circuitry is arranged to connect the output-side voltage node to one of the plurality of voltage output ports corresponding to a higher voltage than a voltage at the input-side switch node in the first phase.

14. Voltage dividing circuitry may be the subject matter of example 12, wherein the relative timings of the transitions between the energy-storing phase and the energy storing phase are controlled to provide a step-down voltage conversion and to connect the output-side voltage node to one of the plurality of voltage output ports corresponding to a lower voltage than the predetermined fixed ratio of the input DC voltage.

15. Voltage dividing circuitry may be the subject matter of any one of examples 1 to 14, wherein the voltage dividing circuitry is responsive to control signals from a controller to transition between states of a sequence comprising a plurality of different states of the voltage dividing circuitry, wherein each state has a respective different switch configuration.

16. Voltage dividing circuitry may be the subject matter of example 15, wherein the controller is to select a target one of the sequence of different states from a present one of the sequence of different states depending on a measurement of a voltage across each of the at least one flying capacitors in the present state and further depending on a measurement of the input DC voltage.

17. Voltage dividing circuitry may be the subject matter of example 16, comprising at least two flying capacitors and wherein the controller is to select the target state by determining if a voltage across each flying capacitor in the present state is high or low relative to a nominal voltage for the respective flying capacitor, the nominal voltage being a predetermined fraction of the determined input voltage.

18. Voltage dividing circuitry may be the subject matter of any one of examples 15 to 17, wherein the controller is to control each transition between different ones of the sequence of different states to ensure that no more than a predetermined number of switches change their respective switching state for any given state transition by switching to an intermediate state prior to the target state if the predetermined number of switch state changes would otherwise be violated.

19. Voltage dividing circuitry may be the subject matter of example 18, wherein the intermediate state is a state in which none of the flying capacitors is either charging or discharging.

20. Voltage dividing circuitry may be the subject matter of any one of examples 15 to 19, wherein the plurality of states of the sequence of different states are selected such that a complete cycle from any starting state through all possible states of the plurality of different states of the sequence finishing at a last of the different states in the sequence results in any one switch of the flying capacitor interface changing state no more than once.

21. Voltage dividing circuitry may be the subject matter of any one of the preceding examples comprising at least one further input DC voltage having a switchable connection to the input-side switch node of the inductor to connect in parallel with or independently to the DC voltage input.

22. Voltage dividing circuitry may be the subject matter of example 21, wherein each of the at least one the further DC input voltages has a smaller magnitude than the DC input voltage.

23. Voltage dividing circuitry may be the subject matter of example 21, wherein at least one of the further input DC voltages has a respective further flying capacitor interface to provide a further predetermined fixed ratio of the further DC input voltage to the input-side switch node of the inductor.

24. Voltage dividing circuitry may be the subject matter of example 23, wherein each of the at least one further flying capacitor interfaces comprises either the same number of flying capacitors as the flying capacitor interface of the DC voltage input or a different number of flying capacitors as the flying capacitor interface of the DC voltage input.

25. Voltage dividing circuitry may be the subject matter of example 20 or example 21, wherein the at least one further DC input voltage comprises one of a solar cell or a charger circuit.

26. A voltage converter for converting at least one input Direct Current, DC voltage to a plurality of output DC voltages, the voltage converter comprising:
the voltage dividing circuitry of any one of examples 1 to 25; and
two or more voltage output connection switches to connect the output-side switch node to respective output voltage rails via the voltage output ports to supply an output digital load; and
a controller to control the voltage dividing circuitry to switch between the first phase and the second phase.

27. The voltage converter of example 26, wherein the controller is arranged to control the voltage dividing circuitry to operate in at least one of a buck mode, a boost mode and a buck-boost mode.

28. The voltage converter of example 26 or example 27, wherein at least one of the output voltage rails comprises a further voltage dividing circuit according to any one of examples 1 to 25, the further voltage dividing circuit to receive the input DC voltage from the output voltage rail and to provide a converted DC output voltage to the output digital load.

29. A power management integrated circuit comprising the voltage dividing circuitry of any one of examples 1 to 25 or the voltage conversion circuitry of any one of examples 26 to 28.

30. The power management integrated circuit, PMIC, of example 29, comprising a plurality of PMIC input voltage source connections and a plurality of PMIC output voltage ports and wherein the voltage dividing circuitry is arranged to receive at the voltage input port, the input DC voltage from any one of the plurality of PMIC input voltage source connections and the plurality of PMIC output voltage ports and to connect the output-side switch node to any other one of the plurality of PMIC input voltage source connections and the plurality of PMIC output voltage ports.

31. A method of converting at least one input Direct Current voltage to a plurality of output DC voltages, the method comprising:
receiving an input DC voltage from a voltage input port;
operating a plurality of switches to connect at least one flying capacitor to the voltage input port and to an input-side switch node of an inductor;
dividing the input DC voltage by a predetermined fixed ratio by charging or discharging the at least one flying capacitor; and
connecting an output-side switch node of the inductor to a plurality of voltage output ports to supply a converted value of the input DC voltage as an output DC voltage.

32. The method according to example 31, comprising controlling the output-side switch node to perform one of a step-up or a step-down in voltage relative to the predetermined fixed ratio if the input DC voltage by controlling configurations of the plurality of switches and by controlling voltages at the input-side-switch node and the output-side switch node of the inductor in a first phase of operation and a second phase of operation.

33. Machine-readable instructions provided on a transient or non-transient machine-readable medium for execution on one or more processors to implement the method of example 31 or example 32.

The invention claimed is:

1. Voltage dividing circuitry for use in a voltage converter for converting at least one input Direct Current (DC) voltage to a plurality of output DC voltages, the voltage dividing circuitry comprising:
a first voltage input port to receive an input DC voltage;
an inductor comprising an input-side switch node and an output-side switch node, wherein the output-side switch node is connectable to one of a plurality of voltage output ports to supply a converted value of the input DC voltage as an output DC voltage; and
a flying capacitor interface comprising a plurality of switching elements coupled in series with the first voltage input port, a first flying capacitor connected in parallel across a first number of switching elements of the plurality of switching elements, and a second flying capacitor connected in parallel across a second number of switching elements of the plurality of switching elements and across the first flying capacitor, wherein the second number of switching elements includes the first number of switching elements and is greater than the first number of switching elements, and the flying capacitor interface is to divide the input DC voltage to provide a predetermined fixed ratio of the input DC voltage at the input-side switch node of the inductor; and a second voltage input port coupled to the input-side switch node of the inductor by a switching element, wherein the second voltage input port is to receive a second input DC voltage, and the first voltage input port and the second voltage input port are connectable in parallel to the input-side switch node of the inductor.

2. Voltage dividing circuitry as claimed in claim 1, wherein the voltage dividing circuitry is arranged to alternately connect the input-side switch node of the inductor to the predetermined fixed ratio of the input DC voltage during a first phase of a buck-boost operation and to ground during a second phase of the buck-boost operation.

3. Voltage dividing circuitry as claimed in claim 1, wherein the voltage dividing circuitry comprises an inductor grounding switching element arranged to alternately connect the output-side switch node of the inductor to ground in a first phase of an operation and to one of the plurality of voltage output ports in a second phase of the operation, and the operation comprises a boost operation or a buck-boost operation.

4. Voltage dividing circuitry as claimed in claim 1, wherein each of the first and second flying capacitors is to provide, upon charge or discharge of at least a subset of the first and second flying capacitors, the predetermined fixed ratio of the input DC voltage at the input-side switch node.

5. Voltage dividing circuitry as claimed in claim 1, wherein the predetermined fixed ratio is a ratio of a number of the first number of switching elements to a total number of switching elements in the plurality of switching elements.

6. Voltage dividing circuitry as claimed in claim 1, wherein:

the voltage dividing circuitry is operable in a boost mode, a buck mode and a buck-boost mode;

in a first phase of the boost mode, the input-side switch node is held at a voltage equal to the predetermined fixed ratio of the input DC voltage while the output-side switch node is grounded;

in a second phase of the boost mode, the input-side switch node is held at the voltage equal to the predetermined fixed ratio of the input DC voltage while the output-side switch node is connected to one of the plurality of voltage output ports;

in a first phase of the buck mode, the input-side switch node is connected to a non-zero voltage while the output-side switch node is connected to the one of the plurality of voltage output ports;

in a second phase of the buck mode, the input-side switch node is grounded while the output-side switch node is connected to the one of the plurality of voltage output ports;

in a first phase of the buck-boost mode, the input-side switch node is held at a voltage equal to the predetermined fixed ratio of the input DC voltage while the output-side switch node is grounded; and in a second phase of the buck-boost mode, the input-side switch node is grounded while the output-side switch node is connected to the one of the plurality of voltage output ports.

7. Voltage dividing circuitry as claimed in claim 1, wherein in a buck-boost mode, a first phase of operation is an energy-storing phase of the inductor, and a second phase of operation is an energy-releasing phase of the inductor;

in the energy-storing phase, the output-side switch node of the inductor is connected either to ground or to one of the plurality of voltage output ports corresponding to a higher voltage than a voltage at the input-side switch node;

in the energy-releasing phase, the output-side switch node of the inductor is connected to one of the plurality of voltage output ports; and timings of transitions between the energy-storing phase and the energy releasing phase are controlled to provide at the output-side switch node, depending on the relative timings, either a step-up in voltage or a step-down in voltage relative to the predetermined fixed ratio of the input DC voltage at the input-side switch node.

8. Voltage dividing circuitry as claimed in claim 7, wherein the relative timings of the transitions between the energy-storing phase and the energy-releasing phase are controlled to provide the step-up in voltage and the voltage dividing circuitry is arranged to connect the output-side voltage node to one of the plurality of voltage output ports corresponding to the higher voltage than the voltage at the input-side switch node in the first phase.

9. Voltage dividing circuitry as claimed in claim 7, wherein the relative timings of the transitions between the energy-storing phase and the energy-releasing phase are controlled to provide the step-down in voltage and to connect the output-side voltage node to one of the plurality of voltage output ports corresponding to a lower voltage than the predetermined fixed ratio of the input DC voltage.

10. Voltage dividing circuitry as claimed in claim 1, wherein the voltage dividing circuitry is responsive to control signals from a controller to transition between states of a sequence of different states to balance voltages on the first and second flying capacitors.

11. Voltage dividing circuitry as claimed in claim 10, wherein the controller is to select a target state of the sequence of different states from a present state of the sequence of different states depending on a measurement of a voltage across each of the first and second flying capacitors in the present state and further depending on a measurement of the input DC voltage.

12. Voltage dividing circuitry as claimed in claim 11, wherein the controller is to select the target state by determining if a voltage across each flying capacitor in the present state is high or low relative to a nominal voltage for the respective flying capacitor, the nominal voltage being a predetermined fraction of the determined input voltage.

13. Voltage dividing circuitry as claimed in claim 11, wherein the controller is to control each transition between different states of the sequence of different states to ensure that no more than a predetermined number of switching elements change their respective switching state for any given state transition by switching to an intermediate state prior to the target state if the predetermined number of switch state changes would otherwise be violated.

14. Voltage dividing circuitry as claimed in claim 10, wherein the states of the sequence of different states are selected such that a complete cycle from any starting state through all possible states of the different states of the sequence finishing at a last of the different states in the sequence results in any one switch of the flying capacitor interface changing state no more than once.

15. Voltage dividing circuitry as claimed in claim 1, wherein
the plurality of switching elements comprise a first switching element, a second switching element, a third switching element, a fourth switching element, a fifth switching element and a sixth switching element;
the first flying capacitor is connected in parallel across the third and fourth switching elements but not the first, second, fifth and sixth switching elements; and
the second flying capacitor is connected in parallel across the second through the fifth switching elements but not the first and sixth switching elements.

16. The Voltage dividing circuitry of claim 15, wherein the voltage dividing circuitry is in a power management integrated circuit (PMIC).

17. Voltage dividing circuitry as claimed in claim 1, wherein the first number of switching elements is two, the second number of switching elements is four, a number of switching elements of the plurality of switching elements is six, and the predetermined fixed ratio is one-third.

18. Voltage dividing circuitry as claimed in claim 1, further comprising:
a third flying capacitor connected in parallel across a third number of switching elements of the plurality of switching elements and across the second flying capacitor, wherein the third number of switching elements includes the second number of switching elements and is greater than the second number of switching elements.

19. Voltage dividing circuitry as claimed in claim 10, wherein
the sequence of different states comprises first, second, third and fourth states;
in the first state, the first flying capacitor is not changed while the second flying capacitor is charged;
in the second state, the first flying capacitor is charged while the second flying capacitor is discharged;
in the third state, the first flying capacitor is discharged while the second flying capacitor is not changed; and
in the fourth state, the first and second flying capacitors are not changed.

20. One or more non-transitory machine-readable media comprising instructions stored thereon that, when executed by one or more processors of a device, cause the device to implement steps comprising:
receiving an input DC voltage from a first voltage input port of a voltage dividing circuit, wherein the voltage dividing circuit comprises an inductor and a flying capacitor interface, the inductor comprises an input-side switch node and an output-side switch node, the output-side switch node is connectable to one of a plurality of voltage output ports to supply a converted value of the input DC voltage as an output DC voltage, the flying capacitor interface comprises a plurality of switching elements coupled in series with the first voltage input port, a first flying capacitor is connected in parallel across a first number of switching elements of the plurality of switching elements, a second flying capacitor is connected in parallel across a second number of switching elements of the plurality of switching elements and across the first flying capacitor, and the second number of switching elements includes the first number of switching elements and is greater than the first number of switching elements;
at the flying capacitor interface, dividing the input DC voltage to provide a predetermined fixed ratio of the input DC voltage at the input-side switch node of the inductor; and
at a second voltage input port coupled to the input-side switch node of the inductor by a switching element, receiving a second input DC voltage, wherein the first voltage input port and the second voltage input port are connectable in parallel or individually to the input-side switch node of the inductor.

21. The one or more non-transitory computer-readable media of claim 20, further comprising instructions for controlling the output-side switch node of the inductor to perform one of a step-up or a step-down in voltage relative to the predetermined fixed ratio of the input DC voltage by controlling configurations of a plurality of switches and by controlling voltages at the input-side-switch node and the output-side switch node of the inductor in a first phase of an operation and a second phase of the operation.

22. Voltage dividing circuitry for use in a voltage converter for converting at least one input Direct Current (DC) voltage to a plurality of output DC voltages, the voltage dividing circuitry comprising:
a first voltage input port to receive an input DC voltage;
an inductor comprising an input-side switch node and an output-side switch node, wherein the output-side switch node is connectable to one of a plurality of voltage output ports to supply a converted value of the input DC voltage as an output DC voltage;
a flying capacitor interface comprising a plurality of switching elements coupled in series with the first voltage input port, a first flying capacitor connected in parallel across a first number of switching elements of the plurality of switching elements, and a second flying capacitor connected in parallel across a second number of switching elements of the plurality of switching elements and across the first flying capacitor, wherein the second number of switching elements includes the first number of switching elements and is greater than the first number of switching elements, and the flying capacitor interface is to divide the input DC voltage to provide a predetermined fixed ratio of the input DC voltage at the input-side switch node of the inductor; and
a second voltage input port coupled to the input-side switch node of the inductor by a switching element, wherein the second voltage input port is to receive a second input DC voltage, and the first voltage input port and the second voltage input port are connectable individually to the input-side switch node of the inductor.

* * * * *

UNITED STATES PATENT AND TRADEMARK OFFICE
CERTIFICATE OF CORRECTION

PATENT NO. : 11,411,491 B2
APPLICATION NO. : 16/642853
DATED : August 9, 2022
INVENTOR(S) : Vivek De et al.

It is certified that error appears in the above-identified patent and that said Letters Patent is hereby corrected as shown below:

In the Claims

Column 20
Line 57, "... DC voltage; and" should read -- ... DC voltage; --

Column 22
Line 15, "... energy releasing phase" should read -- ... the energy-releasing phase --

Column 23
Line 2, "... wherein" should read -- ... wherein: --

Column 24
Line 23, "... input-side-switch node" should read -- ... input-side switch node --

Signed and Sealed this
Fourteenth Day of March, 2023

Katherine Kelly Vidal
*Director of the United States Patent and Trademark Office*